(12) United States Patent
Keller et al.

(10) Patent No.: US 12,116,773 B2
(45) Date of Patent: Oct. 15, 2024

(54) MODULAR PANEL SYSTEM

(71) Applicant: Atomic Design, Inc., Lititz, PA (US)

(72) Inventors: Zachary Andrew Keller, Lititz, PA (US); Stephen Andrew Kaelin, Lititz, PA (US); Adam John Curry, Lititz, PA (US)

(73) Assignee: Atomic Design, Inc., Lititz, PA (US)

( * ) Notice: Subject to any disclaimer, the term of this patent is extended or adjusted under 35 U.S.C. 154(b) by 104 days.

(21) Appl. No.: 17/462,649

(22) Filed: Aug. 31, 2021

(65) Prior Publication Data

US 2023/0061113 A1 Mar. 2, 2023

(51) Int. Cl.
| | |
|---|---|
| *E04B 1/61* | (2006.01) |
| *E04B 2/00* | (2006.01) |
| *E04B 2/56* | (2006.01) |
| *E04C 2/34* | (2006.01) |
| *E04H 1/02* | (2006.01) |
| *E04C 2/00* | (2006.01) |

(52) U.S. Cl.
CPC .............. *E04B 1/6116* (2013.01); *E04B 2/56* (2013.01); *E04C 2/34* (2013.01); *E04C 2/46* (2013.01); *E04H 1/02* (2013.01); *E04B 2001/6195* (2013.01); *E04C 2002/004* (2013.01); *E04C 2002/3488* (2013.01)

(58) Field of Classification Search
CPC .. E04B 1/6116; E04B 2/56; E04B 2001/6195; E04C 2/34; E04C 2/46; E04C 2002/004; E04C 2002/3488; E04H 1/02
See application file for complete search history.

(56) References Cited

U.S. PATENT DOCUMENTS

| | | | | | |
|---|---|---|---|---|---|
| 1,983,040 | A | * | 12/1934 | Lyons | E04F 13/002 52/592.1 |
| 2,243,161 | A | * | 5/1941 | Lahti | B27D 1/06 52/592.1 |
| 3,256,663 | A | * | 6/1966 | Bishop | E04B 1/76 52/395 |
| 4,402,167 | A | * | 9/1983 | Denucci | E04H 5/10 52/562 |
| 5,065,559 | A | * | 11/1991 | Zegel | E04B 2/7427 52/239 |
| 5,136,823 | A | * | 8/1992 | Pellegrino | E04D 1/2916 52/592.1 |
| 5,561,960 | A | * | 10/1996 | Minnick | E04B 1/6183 52/271 |
| 5,842,276 | A | * | 12/1998 | Asher | E04C 2/20 83/16 |

(Continued)

FOREIGN PATENT DOCUMENTS

DE 202005006058 U1 * 3/2006 ............ E04C 2/043

*Primary Examiner* — Babajide A Demuren
(74) *Attorney, Agent, or Firm* — Barley Snyder

(57) ABSTRACT

A modular panel is provided and includes a sill plate, a top plate, a plurality of vertical studs, and having at least one skin applied to a major face of the modular panel that presents a first edge having a waveform profile configured to connect to an opposing edge of an adjacent modular panel. At least one of the vertical studs is an end stud having a connector element configured to be secured to a complementing connector of the adjacent modular panel. Two or more of the modular panels may be connected together to form part of a shelter.

23 Claims, 29 Drawing Sheets

(56) References Cited

U.S. PATENT DOCUMENTS

| | | | | |
|---|---|---|---|---|
| 6,802,168 B1* | 10/2004 | Minnick | ............... | E04B 2/7425 |
| | | | | 312/265.5 |
| 7,516,587 B2* | 4/2009 | Barlow | ................ | E04F 15/105 |
| | | | | 52/177 |
| 8,672,597 B2* | 3/2014 | Selle | .................... | F16B 37/062 |
| | | | | 411/181 |
| 10,011,989 B2* | 7/2018 | Pence | .................... | E04C 2/296 |
| 2007/0283658 A1* | 12/2007 | Siewert | .................. | E04F 13/10 |
| | | | | 52/590.2 |
| 2008/0069660 A1* | 3/2008 | Selle | ....................... | F16B 39/34 |
| | | | | 411/179 |

\* cited by examiner

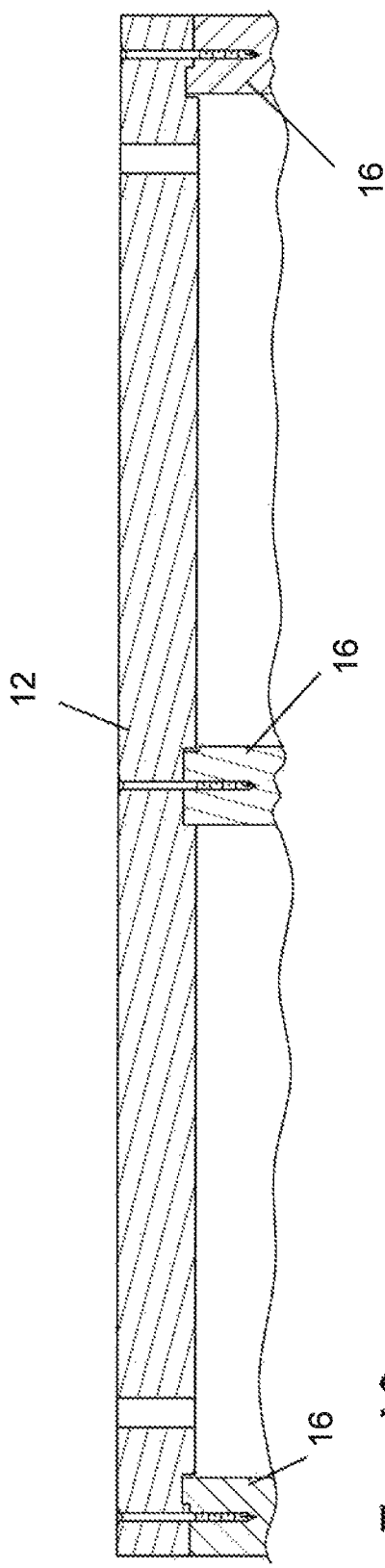
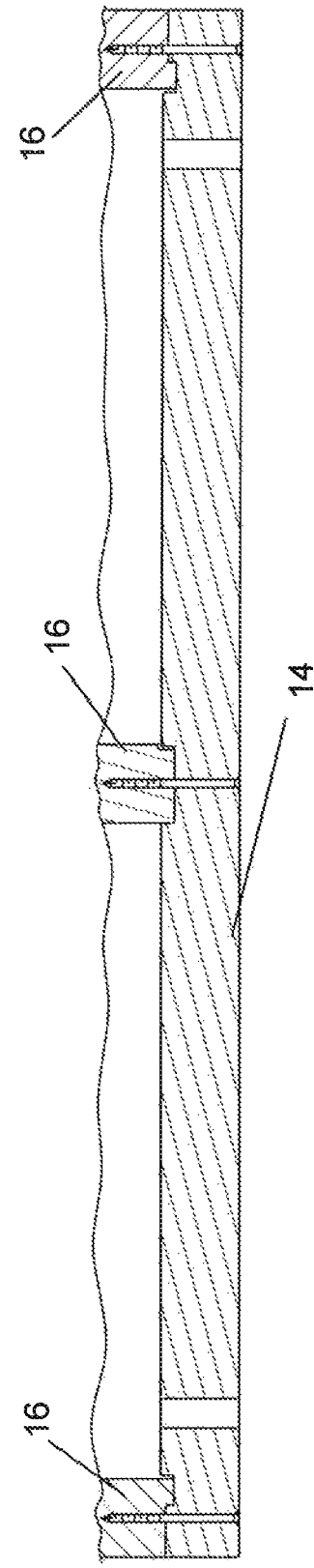
FIG. 12
FIG. 13

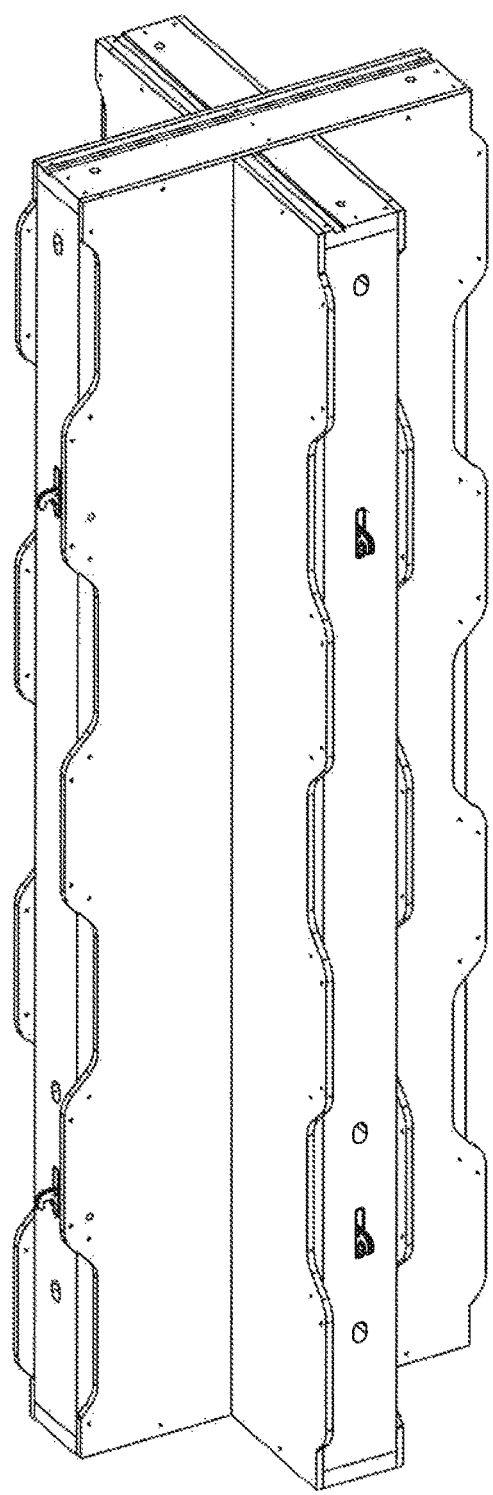
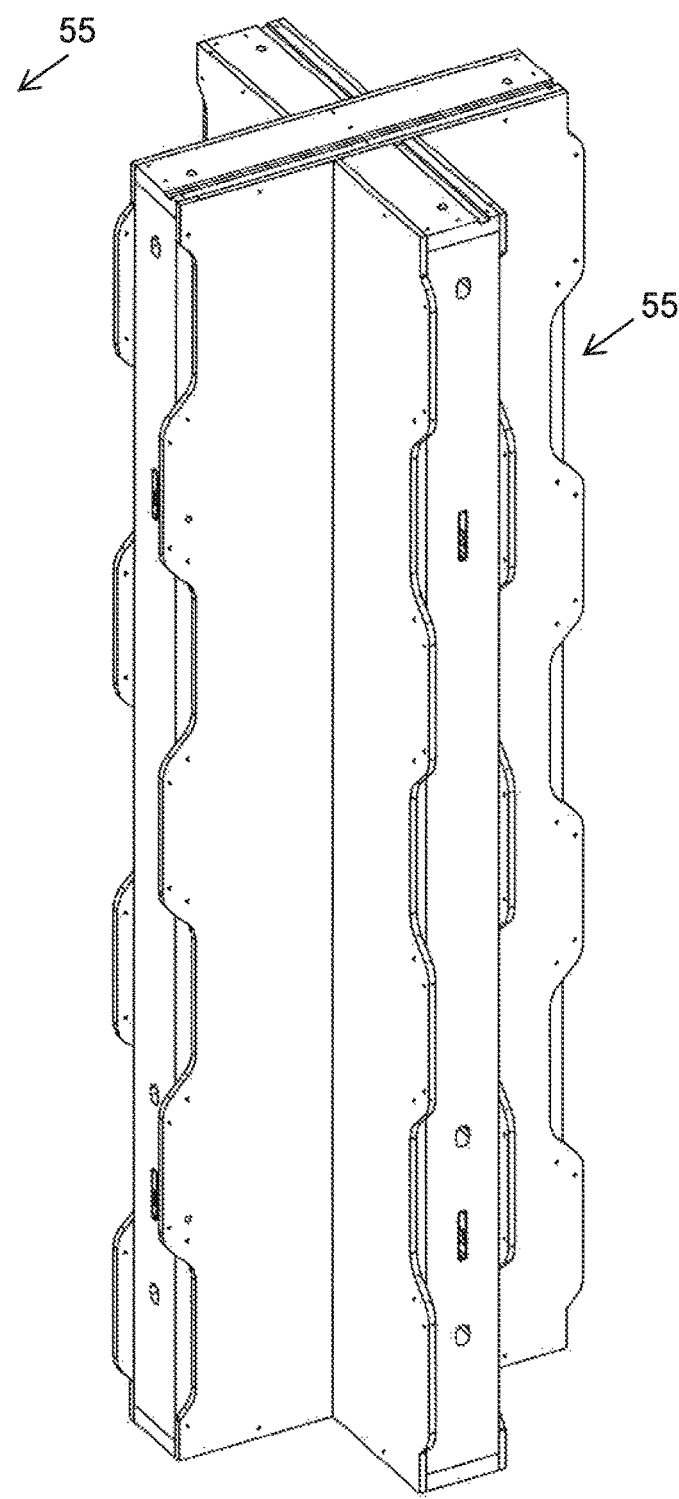
FIG. 23
FIG. 24

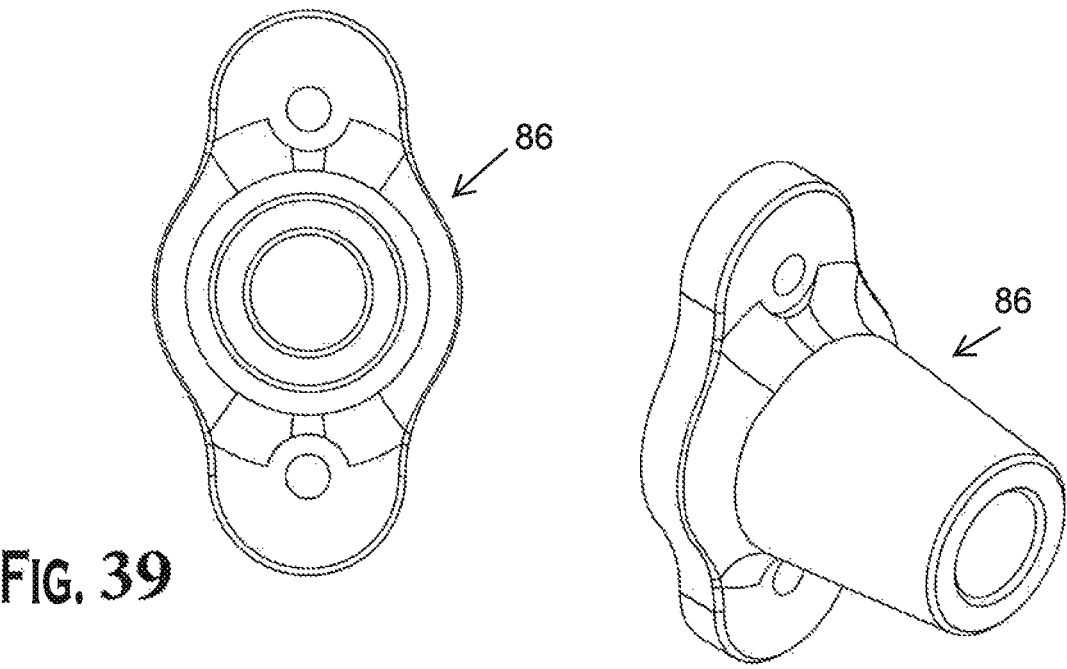
FIG. 39
FIG. 40
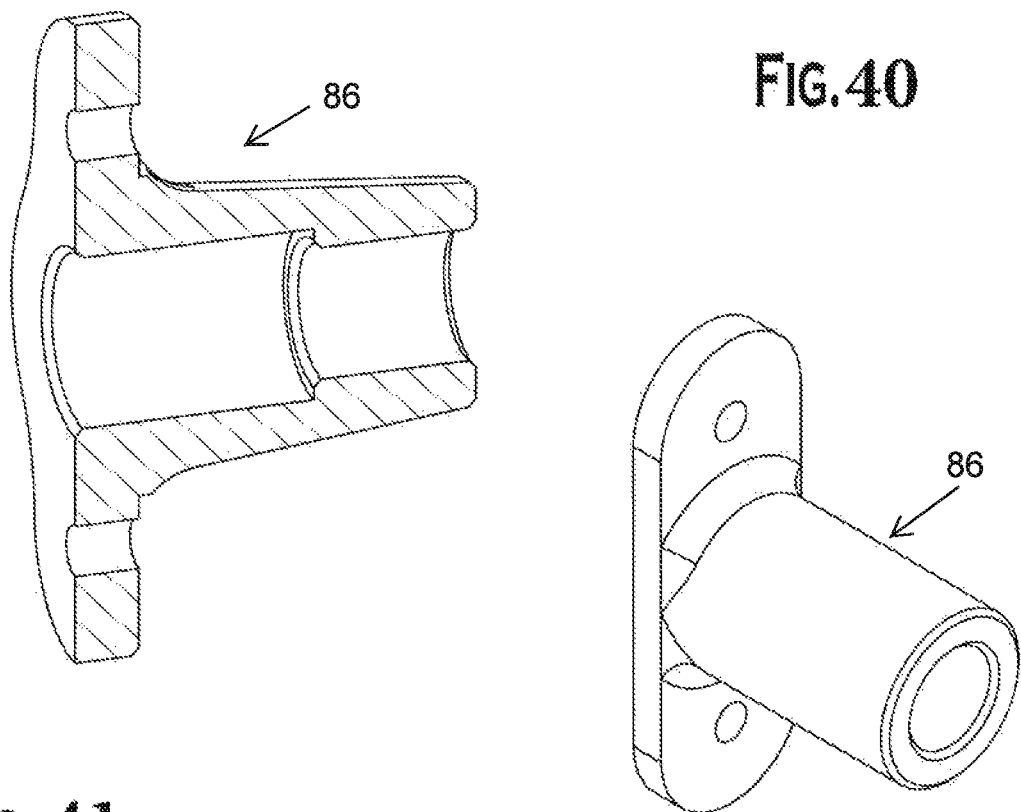
FIG. 41
FIG. 42

MODULAR PANEL SYSTEM

FIELD OF THE INVENTION

The invention relates to modular panels and, more particularly, to systems for connecting a plurality of panels, such as may be usefully deployed as part of emergency housing units.

BACKGROUND

Natural disasters, such as earthquakes, wildfires, tornadoes, often result in large populations that have been displaced from their homes and will require shelter. Temporary housing, such as tents, are frequently used as emergency housing, as they can provide shelter, and can be transported and quickly assembled on site, though may be unsuitable in climates that experience harsh weather or high winds associated with storms, and require maintenance and more frequent replacement, in addition to failing to provide security, as tents can easily be entered by unauthorized individuals.

Modular buildings may provide more suitable long-term emergency housing than tents. Module buildings are at least partially prefabricated and can be supplied as modules where sections of the building are built in advance and transported to the destination final for assembly on site. Several modules may be connected to form the final building. In order to ensure that the modules fit together, it is necessary to design components that will fit together well and have accurate dimensions. Using modular home construction techniques, faster completion of housing units can be achieved, relative to traditional homes built on site using traditional methods.

Thus modular housing units can be provided, and are advantageously less expensive, and can be produced, transported, and quickly and accurately assembled on site, relative to traditional construction techniques for residences, thereby providing affordable housing that may otherwise be out of financial reach for many.

Various methods of constructing modular homes are often employed. There is a need for a cost effective, rigid, dimensionally accurate panel that can be assembled on site with simple tools as part of a modular home, such as may be useful for disaster relief and humanitarian needs, though may also provide affordable, more easily built shelters.

SUMMARY

Therefore, a panel useful for construction of a modular building unit is provided and in an exemplary embodiment, the modular panel includes a sill plate, a top plate, a plurality of vertical studs extending between top plate and the sill plate, and at least one skin on a major face of the modular panel presenting at least a first edge having a waveform profile for connecting to an adjacent modular panel; and at least one of the vertical studs being an end stud and having at least one connector element configured to be secured to a complementing connector element of an adjacent second modular panel.

In an embodiment, the modular panel has a first edge of the skin that provides protruding portions and recessed portions. The edge waveform may be, or combine elements that are trapezoidal, sinusoidal, square, rectangular, triangular, and sawtooth waveforms. The waveform profile of the first edge may have a midline that aligns with the outside dimension of the end stud.

In an embodiment, the modular panel has a first edge that is configured to engage a complementary edge of an adjacent panel. The modular panel may employ a connector element that is part of a blind panel connector. The connector element may be a hook element or pin element. The modular panel may employ a connector element that is a captive bolt assembly or tee-nut. The captive bolt assembly may have a flange and a bolt with a head and a body with at least a portion of the body being threaded to rotatably engage with the tee-nut.

In an embodiment, multiple modular panels may be connected together to form a vertical wall, which may be part of a modular shelter that can be transported partially constructed and assembled on site.

In an embodiment, multiple modular panels may have an edge presenting a location lug that can be received within a recessed opening of an adjacent panel edge.

In an embodiment, the modular panel may have at least one opening, for example, as a window or doorway.

In an embodiment, the modular panel may further comprise a second edge on an opposite side of the skin from the first edge, the second edge presenting a waveform profile that is complementary to the profile of the first edge. The second edge waveform may have a midline that is in alignment with an outside dimension of the second end stud. The modular panel may have a first and second vertical stud that are both end studs, the first end stud being a male end stud, the second end stud being a female end stud. The male end stud may have a connector element that is a hook element, and the female end stud may have a connector element that is a pin element.

In an embodiment, the modular panels may be connected to form part of a modular shelter. In an embodiment, at least two panels may be connected to form at least a part of a vertical wall.

In an embodiment, there is provided a modular panel system having at least two modular panels, the first and second modular panels each having a sill plate, a top plate, a plurality of vertical studs extending between top plate and the sill plate, and at least one skin on a major face of the modular panel. The first modular panel may have a first edge of the skin having a first waveform profile and at least one of the vertical studs being a first end stud and having at least one first connector element. The second modular panel may have a second edge of the skin having a second waveform profile that is complementary to the first waveform profile, and at least one of the vertical studs being a second end stud and having at least one second connector element that is complementary to the first connector element; wherein the first and second end studs may be connected together so as to join the first and second modular panels together.

In an embodiment, there is provided a modular panel system having at least a first modular panel and a second modular panel, each of the first modular panel and the second modular panel comprising a sill plate, a top plate, a plurality of studs extending between top plate and the sill plate, and having at least one skin on a major face of each of the first modular panel and the second modular panel. The first modular panel may have a first edge of the skin having a first waveform profile and at least one of the vertical studs of the first modular panel being a first end stud with at least one first connector element. The second modular panel may have a second edge of the skin having a second waveform profile that is complementary to the first waveform profile of the first modular panel, and at least one of the vertical studs of the second modular panel being a second end stud with at least one second connector element that is complementary to the first connector element. The first and second end studs may be connected together, so as to join the first and second modular panels together.

In an embodiment, the modular panel system may further have at least one adapter module having at least a first and second edge of the adapter module, each of the first and second edge of the adapter module configured to conform to an edge of the first modular panel or the second modular panel. The adapter module may be a shape selected that is one of cross-shaped, T-shaped or L-shaped.

BRIEF DESCRIPTION OF THE DRAWINGS

The invention will be explained in greater detail in the following with reference to embodiments, referring to the appended drawings, in which:

FIG. 12 is a partial sectional view in cross-section of the top plate of the modular panel of FIG. 11, taken along line 12-12;

FIG. 13 is a partial sectional view in cross-section of the sill plate of the modular panel of FIG. 11, taken along line 13-13;

FIGS. 23 and 24 depict perspective views of an exemplary embodiment of a connector module embodiment configured to join modular panels in an "X" shape;

FIGS. 39, 40, and 41 are enlarged perspective and cross-section views of the flange of the male connector element, according to an exemplary embodiment of the invention;

FIGS. 42 and 43 are enlarged perspective and cross-section views, respectively, of an alternative flange of the male connector element, according to an exemplary embodiment of the invention;

DETAILED DESCRIPTION OF THE EMBODIMENT(S)

Embodiments of the invention will now be described in greater detail with reference to the drawings.

Figure 1:
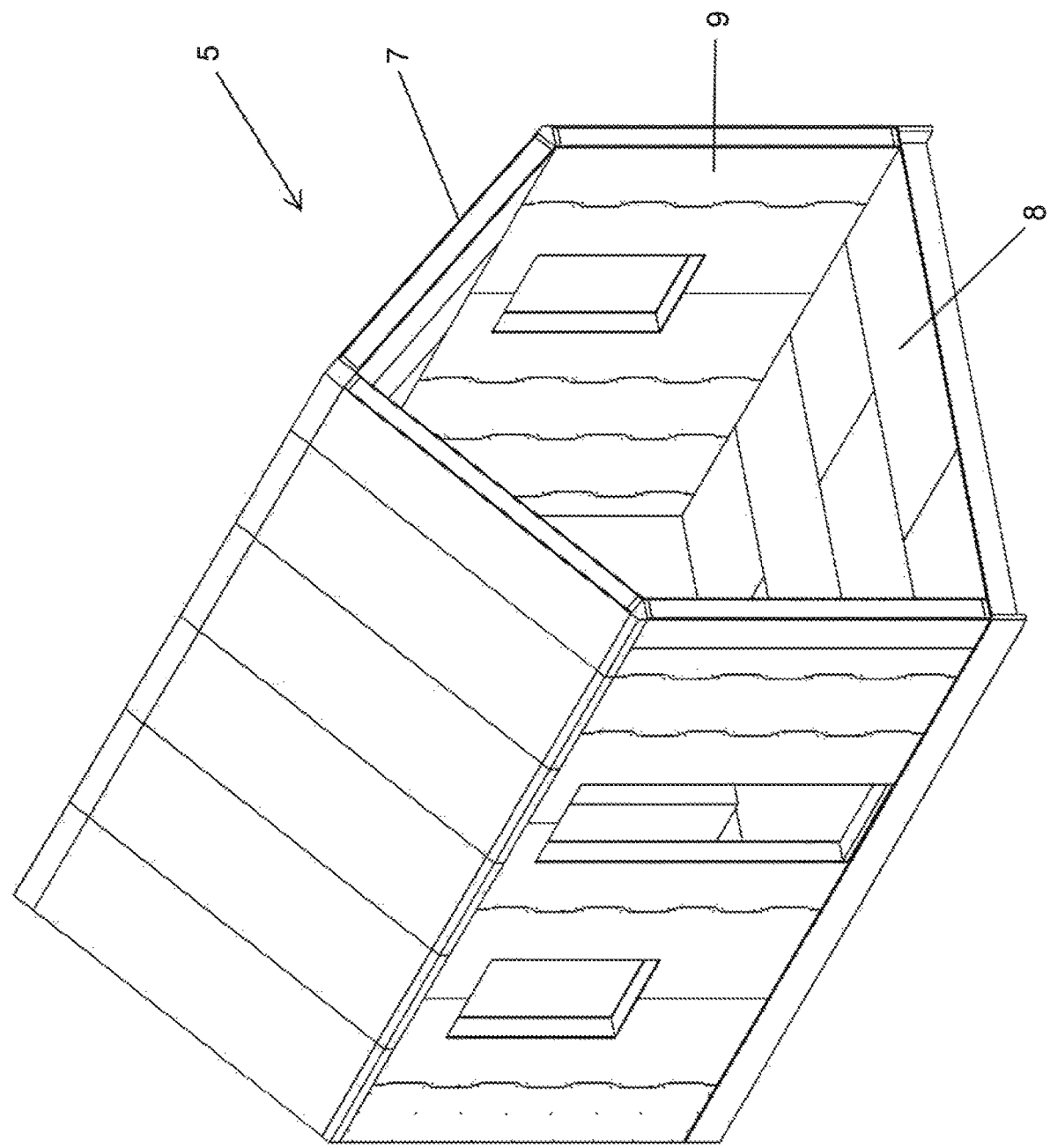
FIG. 1 is an perspective view of a shelter incorporating a plurality of exemplary embodiments of modular panels, according to the invention.
Figure 2:
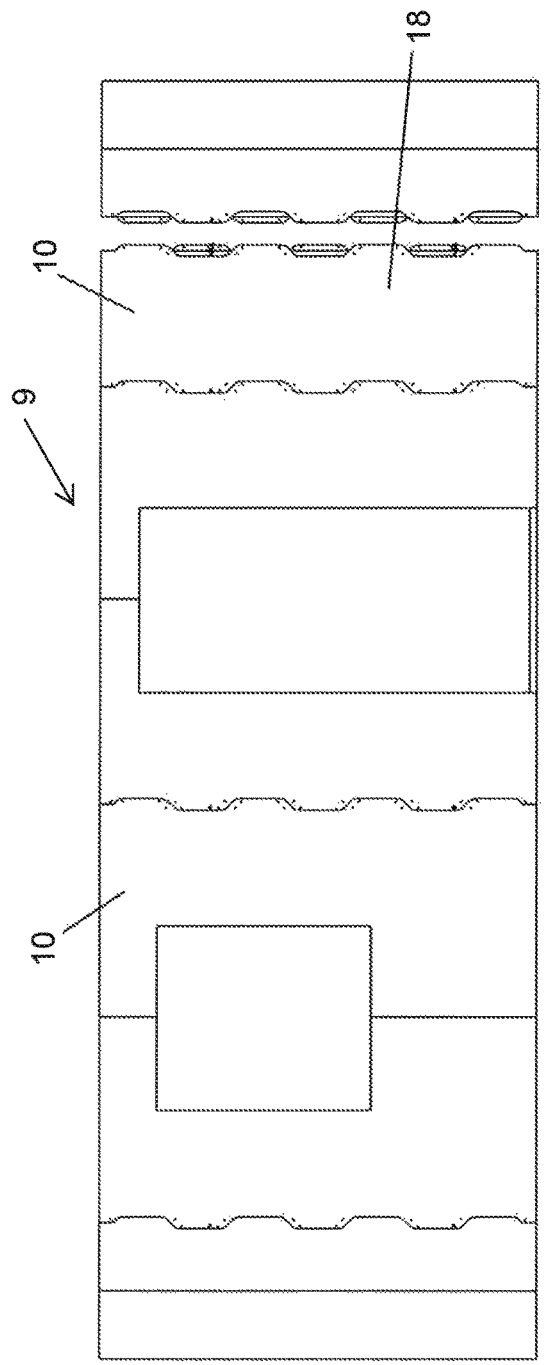
FIG. 2 is an orthogonal side view of a wall incorporating a plurality of exemplary embodiments of modular panels, according to the invention.
Figure 3:
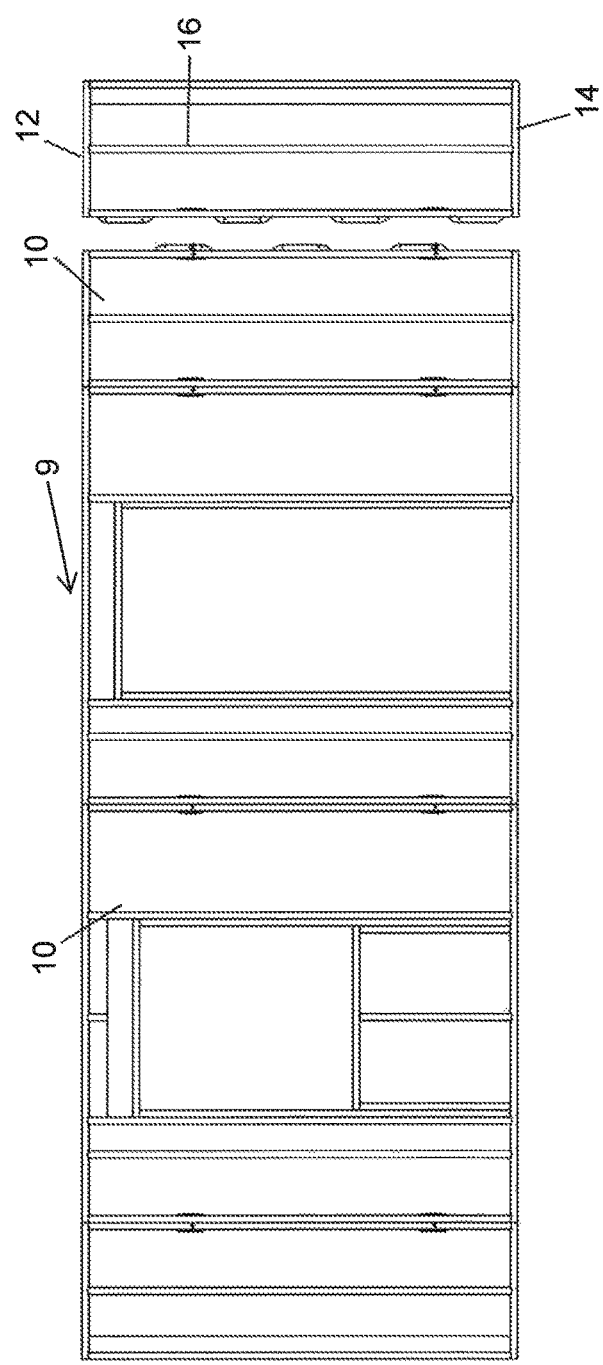
FIG. 3 is an orthogonal side view of the wall of FIG. 2 with the outside surface components removed to reveal internal structural components of the wall, and depicting the internal structural components of a plurality of modular panels, according to the invention.

Referring first to FIG. 1, there is depicted an exemplary model of a modular shelter 5, having a floor 8, a roof 7, and at least one vertical wall 9 extended between the floor and roof. In an embodiment, the modular shelter may have at least 4 vertical walls, so as to enclose the interior securely. It is contemplated that additional configurations for the shelter layout are possible, and may require additional walls, or alternative roof and floor components as would be known to those skilled in the art. As can be see, in FIG. 1, at least one of the vertical walls may be provided with a doorway opening, and optionally at least one window opening. The depicted shelter in FIG. 1 depicts the modular unit partially assembled, and when fully assembled may optionally have window in each window opening, and a door installed in the door opening. In some embodiments, the shelter 5 may further have exterior applications to provide additional weather protection and aesthetics, including optionally, shingles or other suitable roofing products, for example metal panels, or shingles on the roof, and may further have a weather resistive barrier, such as housewrap, insulating foam board panels, and may optionally have a finishing layer, such as siding, clapboard, stucco, brick, or rock, or a veneer of brick or rock on the vertical wall surfaces to provide a weather proof exterior that models traditional homes. As depicted in FIGS. 1-3, the vertical walls 9 of the shelter 5 may have a plurality of panels 10 making up some or all of the vertical walls.

As shown in FIGS. 2 and 3, in an exemplary embodiment, each of the vertical walls 9 of the shelter 5 has at least one modular panel 10. Each modular panel 10 is a load-bearing article, providing at least one vertical end that is suitable for connection to another adjoining panel 10, as will be discussed. The modular panels 10 utilized for construction of the vertical walls 9 may vary in width, where the width dimensions of each panel may be adjusted based on the dimensions of the shelter in which the panel is to be used. For example, with reference to FIGS. 2 and 3, the modular panels 10 may vary in width within the shelter, and as shown, may include at least one narrow panel, for example, as shown located on the left and right most portions of the sidewall, as well as having at least one wider panel, for example, as shown with one of the wider panels containing a window opening and the other having a doorway opening. It is contemplated that any of the panels need not always be provided with an opening, but rather the dimensions and the inclusion of openings in the panels would be determined by the shelter design.

The vertical wall 9 in the shown embodiment includes a plurality of modular panels 10, each having a top plate 12, a sill plate 14, a plurality of vertical studs 16 extending between the top plate and the sill plate, and may optionally have one or both of a skin layer on a first major surface, such as the outside face of the modular panel, and on a second major surface, such as the inside face of the modular panel 10, with each of the skin layers, if present, optionally having a waveform end, as will be discussed. As depicted in FIG. 3, the vertical wall is depicted without the outside skin layer, which may be removed in order to allow visualization of the structural components within each of the modular panels 10 of the sidewall 9. Alternatively, it is contemplated that the vertical wall as depicted may lack one of the skin layers, either from the first or second major surface of the vertical wall. The construction and connection of modular panels will be discussed later. For those embodiments of the modular panel 10 having an opening in the panel, such as a doorway opening, or a window opening, appropriate framing can be provided, in the form of additional framing components needed for the opening, as is known to those skilled in the art. For example, the framing for the opening may require horizontally placed components, such as headers and sill plates, extended between neighboring studs within the wall, and may further have vertical framing supports, such as jack studs, trimmers, king studs, and cripple studs, as commonly employed, so as to frame the opening for finishing with the required component, whether window or door, in a manner that the component would be properly structurally supported.

Figure 17:
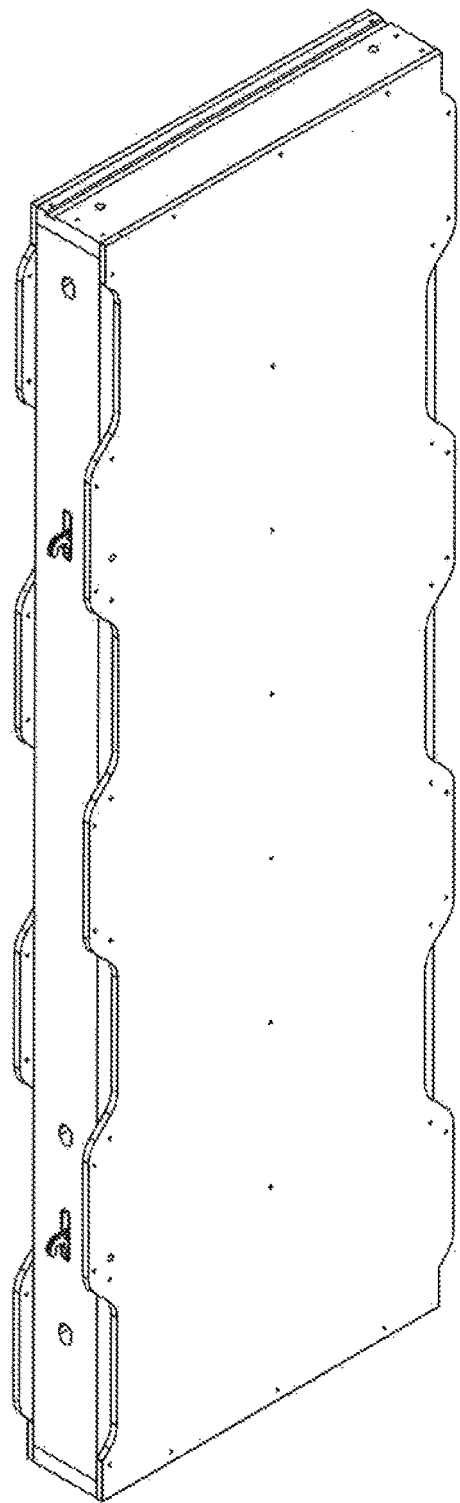
FIG. 17 is a perspective view of an alternative exemplary embodiment of a modular panel, having horizontally aligned framing between the vertical end studs.
Figure 18:
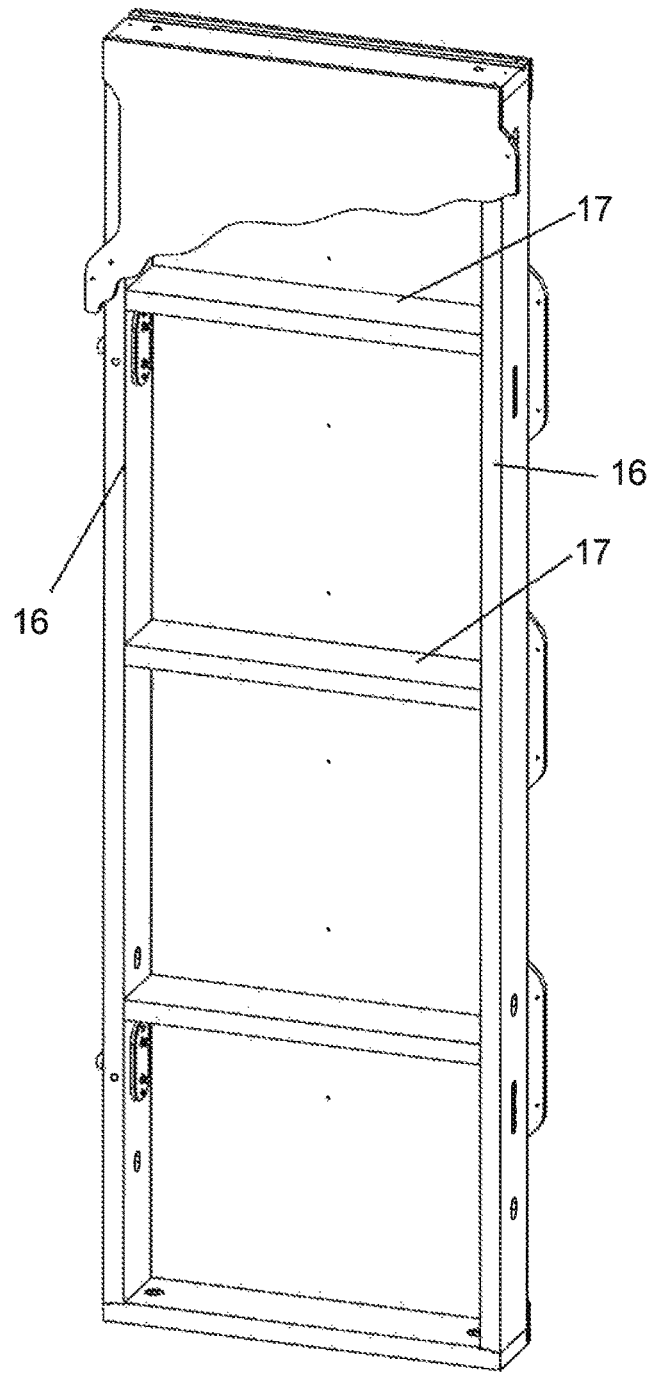
FIG. 18 is a perspective side view of internal structural components of an alternative exemplary embodiment of the modular panel, having horizontally aligned framing between the vertical end-studs.
Figure 19:
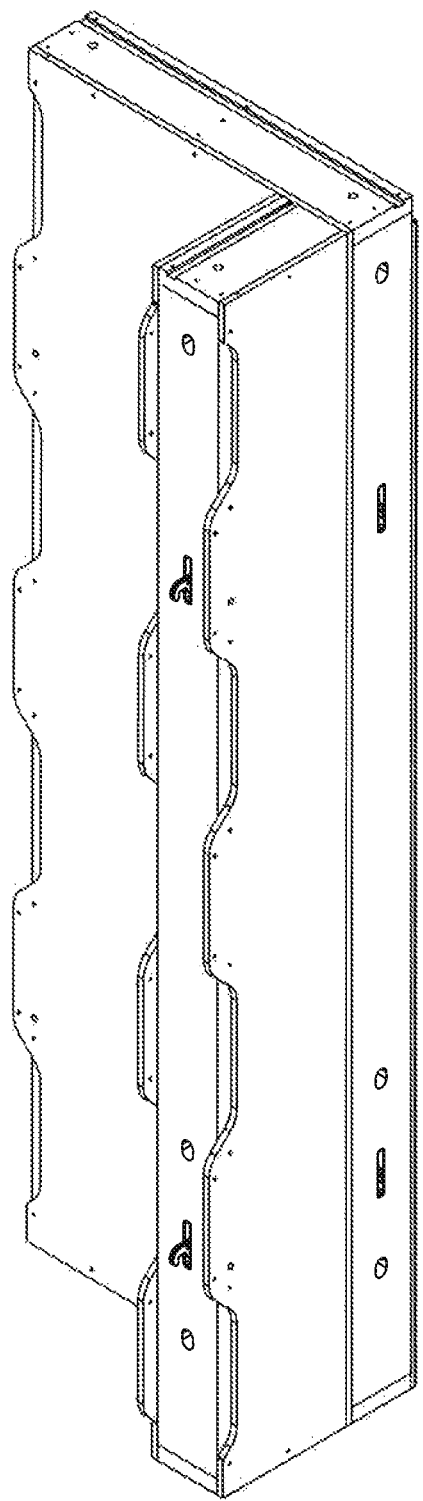
FIGS. 19 and 20 depict perspective views of an exemplary embodiment of a connector module embodiment configured to join modular panels in an "L" shape.
Figure 20:
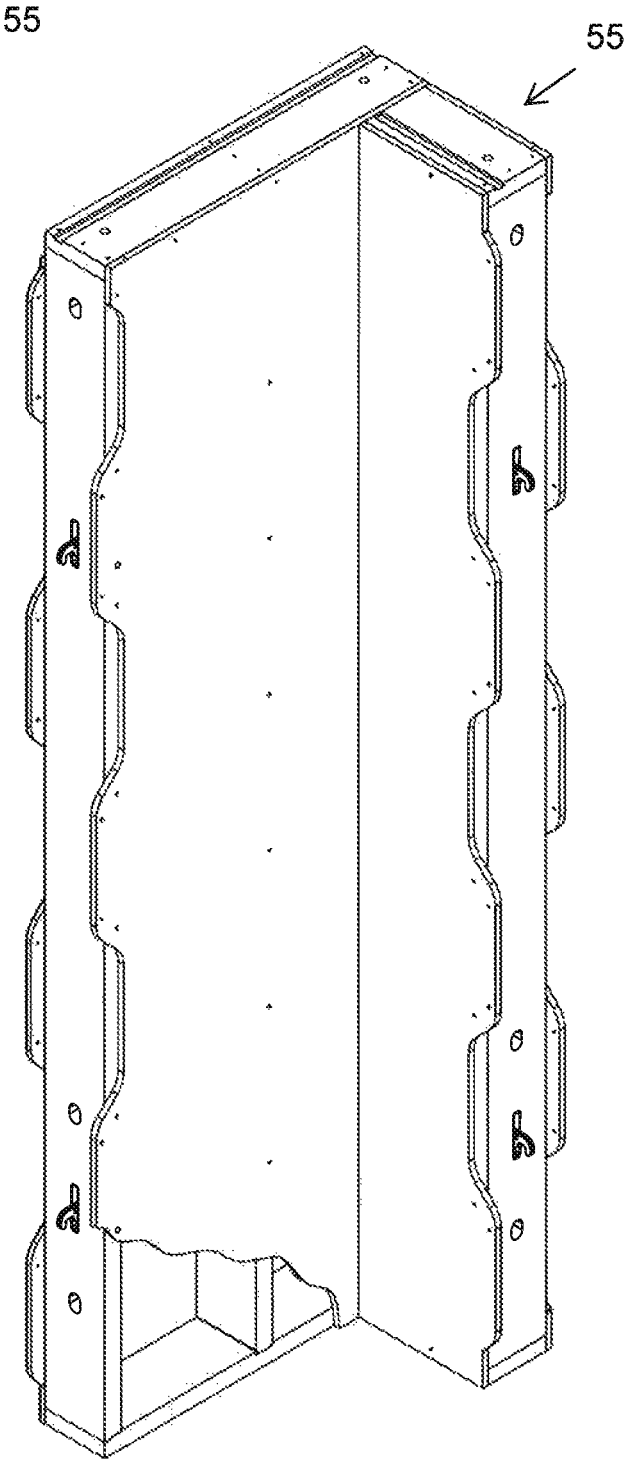

In an alternative embodiment of the modular panel, as depicted in FIGS. 17 and 18, there may be provided a modular panel having one or more horizontal framing elements 17, as can be seen with reference specifically to FIG. 18, positioned between the vertical studs 16 that are end studs for the modular panel. As shown, the modular panel of FIG. 18 may be provided with multiple horizontal framing elements 17, that may serve as noggings to reinforce the panel to better withstand loads, and may also beneficially serve as nailers, to allow securement of additional items to the framing of the panel, as is known to those skilled in the art. As has been discussed previously, the modular panel of FIG. 17, may optionally be provided with a skin on either, or both of the first and second major surfaces of the panel, as depicted, and each skin may optionally provide a waveform end, as will be discussed.

It is contemplated that any of the panels described herein may be used in any suitable orientation beyond the orientations described herein, and result in forming a planar surface comprising one or more modular panels that may be joined together as taught herein. For example, the panel of FIGS. 17 and 18, may optionally be rotated 90 degrees to place the framing components 17 into a generally vertical orientation, and whereupon the end studs 16 would become the top and sill plates. The panel, in such a configuration would be capable of having multiple panels 10 stacked to form the vertical wall. Alternatively, the modular panel embodiment of FIGS. 17 and 18, or any of the modular panels described herein, may be usefully employed in any orientation as may be required, such as flooring, walls, ceiling panels, or roof support panels, by rotating the panel to the appropriate orientation for the role contemplated by the design.

Figure 11:
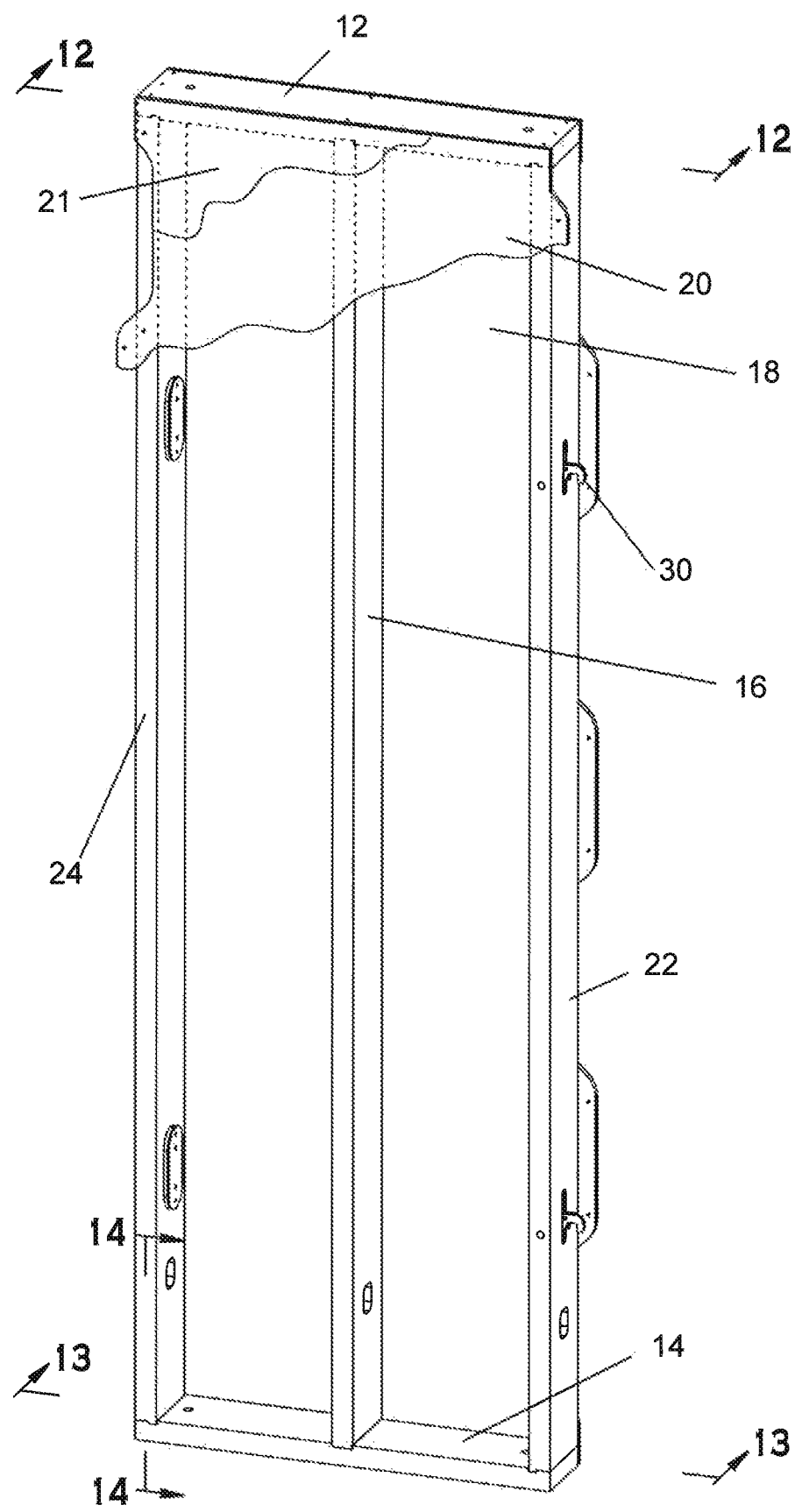
FIG. 11 is a perspective side view of internal structural components of the modular panel, according to an exemplary embodiment of the invention.
Figure 14:
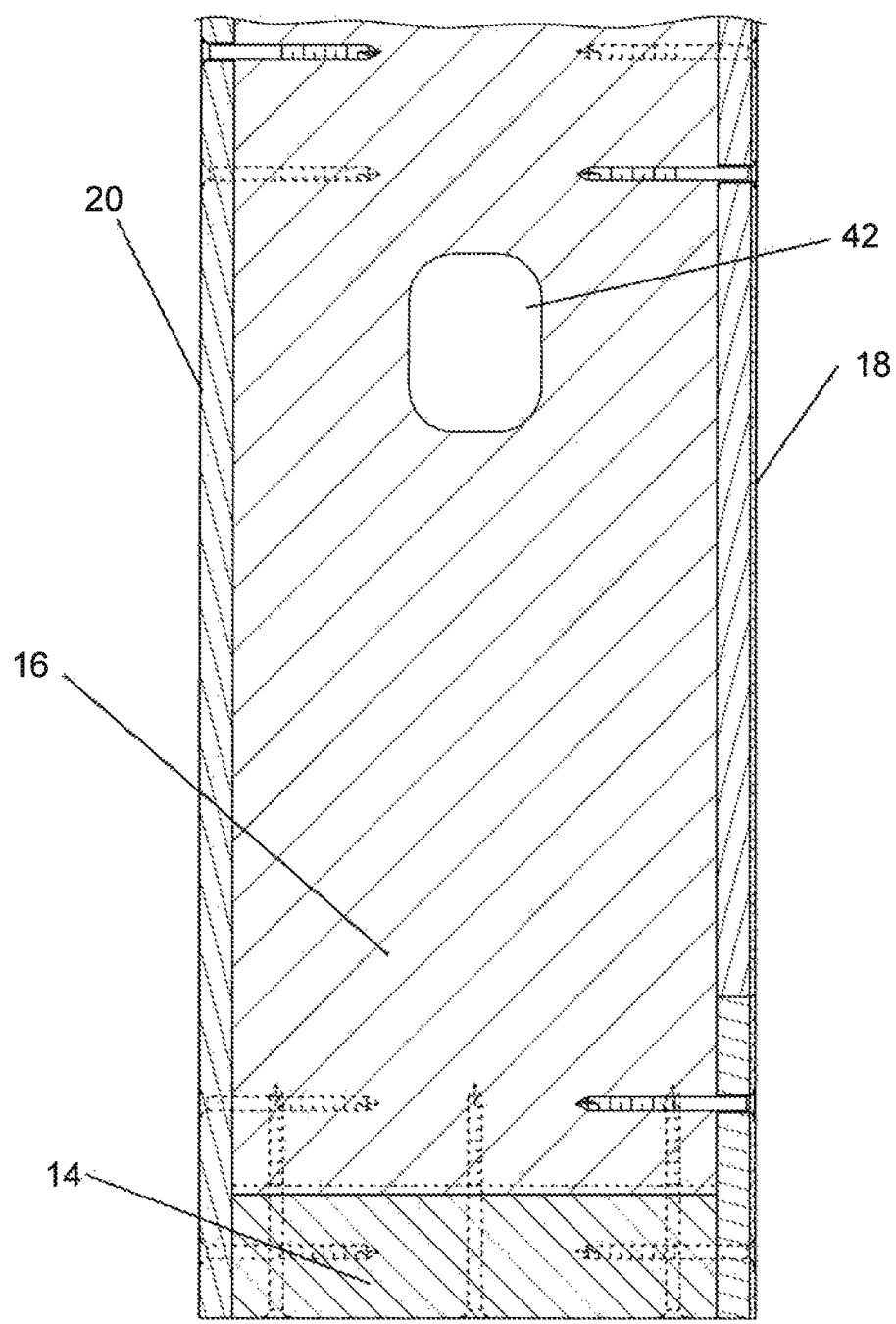
FIG. 14 is a partial sectional view in cross-section of the sill plate and vertical studs of the modular panel of FIG. 11, taken along line 14-14.

Internal construction elements of an exemplary modular panel 10 can be seen with reference to FIG. 11, where there is provided a sill plate 14, a top plate 12, and a plurality of vertical studs 16 extending between the sill and top plates. For any of the embodiments contemplated herein, it is recognized that the framing components utilized may be any suitable framing material known to those skilled in the art, including, but not limited to dimensional lumber, laminated strand lumber, metal framing components, plastic lumber, engineered lumber, oriented strand lumber, oriented structural straw board, as non-limiting examples. It is recognized that wood and pulp based framing components may tend to warp, have defects, such as knots, or be affected by moisture content and manufacturing technique, as is often seen with dimensional lumber. The modular panels contemplated herein will desirably be dimensionally accurate, and in order to ensure dimensional accuracy of the components and the resultant framing with the assembled components, the framing components may be machined to precise dimensions. For example, the top and sill plates may be provided with grooves or mortises milled into the surfaces, in order to ensure that the joining surfaces are dimensioned properly, and the grooved faces are at the proper depth within the lumber. This can be seen with reference to FIGS. 12 and 13, where the material provided as the top and sill plates 12, 14 may be machined, milled, or formed such that there are provided grooves or mortises for receiving the vertical framing pieces therein, and the formed mortises are certain to have the correct dimensions for ensuring the resulting panel dimensions are accurate. Additionally, the studs 16 may be machined or milled to proper width and length, such as by providing a ridge component that fit into the mortises. In this manner, any swelling, warping, or shrinkage, or dimensional variations of the framing materials may be removed by milling the portions to be secured together to precise dimensions. The modular panel may optionally further have a skin on one or both of the first and second major faces of the modular panel 10, shown partially depicted in FIG. 11, as inside skin 18, and outside skin 20 (with the visible major face of FIG. 11 being an outside surface). Optionally, one or both of the skins may have a membrane layer 21, which may be a barrier membrane, as will be discussed. Additional cross-sectional views of portions of the modular panel 10 can be seen with reference to FIGS. 12-14. FIG. 12 depicts the cross-section view of the top plate and the vertical studs, with fasteners utilized to secure the components together. FIG. 13 depicts the cross-section view of the sill plate and vertical studs. As discussed previously with reference to FIGS. 12 and 13, the top and sill plates 12, 14 may optionally be provided with grooves or slots in the plate to receive the vertical studs therein, thereby ensuring accurate placement of the vertical studs, but furthermore enhancing the ease and speed with which the modular panels may be constructed. Additionally, the framing components may optionally provide for the inclusion of ridges on the vertical studs, such that the vertical stud, or at least the ridge of the vertical stud, may reside within the slot of either the top plate or the sill plate and may further enhance the rigidity of the modular panels, as the vertical studs would be more securely retained in contact with the top and sill plates within the slot. It is contemplated that the grooves may be absent, and traditional fastener application may be adequate to retain the vertical studs in place against the top and sill plates. FIG. 14 depicts another cross sectional view of the sill plate 14, and the female end stud 24. Further depicted are the inside and outside skins 18, 20 and exemplary placement of fasteners for securing the components together.

As shown in the exemplary modular panel 10, the plurality of vertical studs 16 include a male end stud 22 and a female end stud 24, with at least one inside stud 16, here depicted as a single inside stud in FIG. 11. It is contemplated that in some embodiments of the modular panel 10, the number of inside studs provided may be varied, depending on the width of the panel being provided, and may be any integer ranging from 0, and up to two less than the total number of studs in the modular panel. The number of vertical studs may be varied to accommodate different vertical load requirements, and length considerations for ease of transporting or maneuvering of the modular panels. It is contemplated that much longer panels, having a greater number of vertical studs are feasible, especially where a longer modular panel is required, and the panel may be transported and maneuvered using equipment. For example, as shown in FIG. 3, the narrow end panels have a single inside stud between the two end studs; and the wider panels depicted have a greater number of inside studs, namely 3 inside studs, between the two end studs, along with the framing elements for the openings of the modular panel. It is contemplated that the number of inside studs may exceed 5, may exceed 10, may exceed 20 in number, and be placed, consistently, or inconsistently, at any suitable spacing between the studs to accommodate the desired panel length and load requirements. Furthermore, it is contemplated that an end stud may be neither male, nor female, where that end stud need not be connected to an adjoining panel. For example, as depicted in FIG. 3 where the right most panel is a narrow panel having a female end stud on the left that may be connected with a neighboring panel, an inside stud, and a genderless end stud on the right lacking connections features. The modular panel inside and outside skins, if present, may be a layer substantially covering the modular panel, but for any openings, and any adjoining edge, where the skin may have profile that allows connection to an adjoining panel, as will be discussed. The skin may be any suitable structural layer including wood, plastic, metal or other material that fits requirements of a particular use. The skin may optionally provide a barrier membrane layer 21, such as a vapor barrier layer applied to an exterior surface of the skin. Such a barrier layer may be integrally formed onto the skin or applied onto the skin panel, as is known to those skilled in the art. The barrier membrane layer may be applied to the skin surface as a liquid coating, for example by spraying, dipping, or painting as non-limiting examples, and then dried or cured onto the skin surface prior to deployment or use of the panel. Alternatively, the skin layer may be a layer applied to the skin, using an adhesive or fasteners, and may be provided prior to, during or after the assembly of the panel. In a preferred embodiment, the barrier layer is in place of the skin layer prior to deployment of the panel for assembly in a modular shelter. Any suitable barrier membrane may be employed, and may beneficially provide any one or more of structural durability, thermal insulation, moisture or air barrier, and aesthetic coating, as non-limiting examples. Commonly employed wood skins may include materials such as plywood, oriented strand board, fiberboard, chipboard, particleboard as non-limiting examples. One skilled in the art would appreciate that the shape, size, and materials of the modular panel 10 can be modified and designed for a particular use. The skins 18, 20 of any of the panels 10 may be affixed by the use of one or more of adhesives and fasteners between the skin and the structural components of the modular panels. For example, fasteners, such as nails or screws may be driven through the skin into the structural components of the modular panels 10, such as the vertical studs 16, and/or the top plate 12 and sill plate 14, optionally with a suitable construction adhesive.

Figure 4:
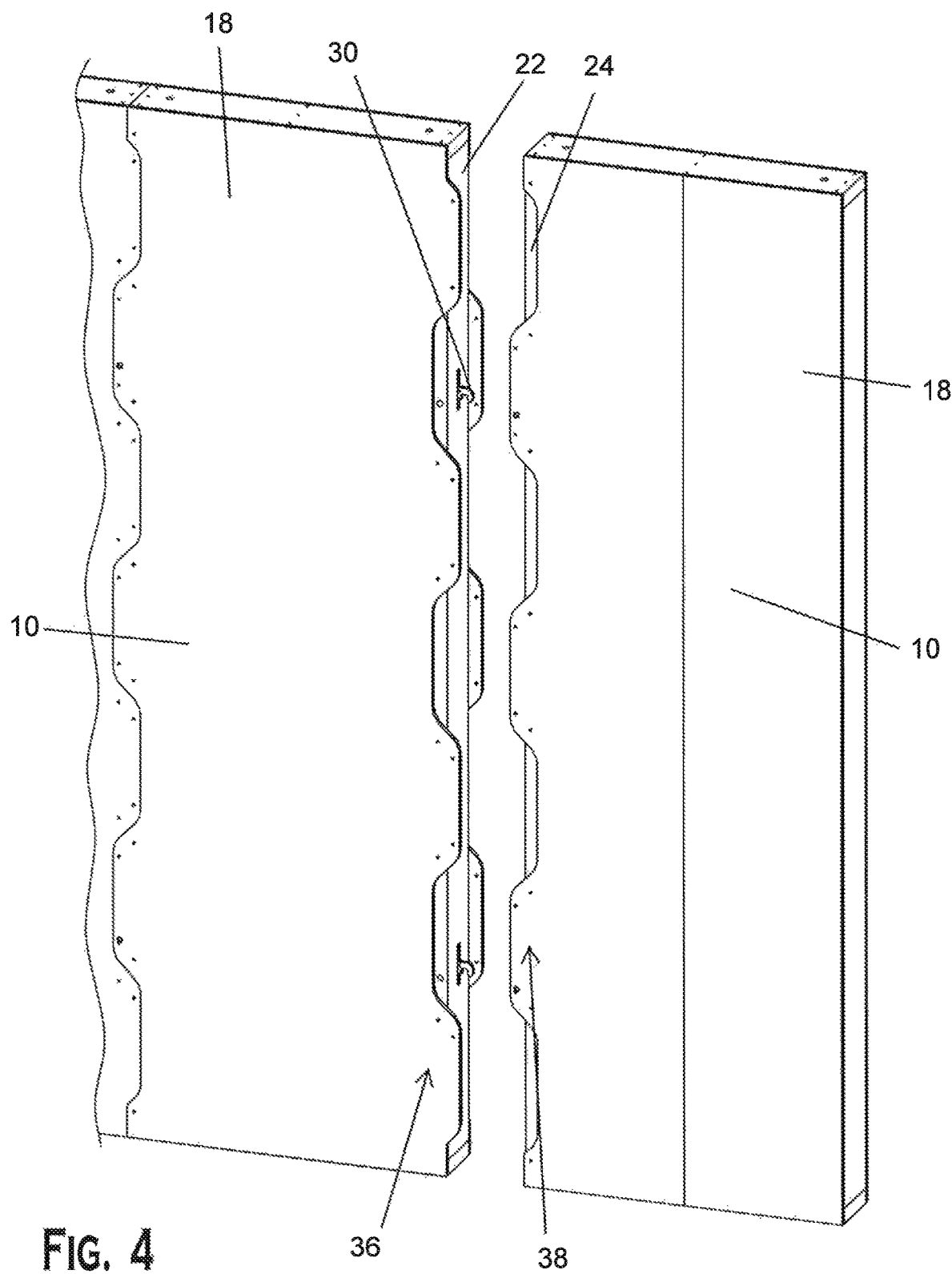
FIG. 4 is a perspective view of the modular panels to be connected, according to an exemplary embodiment the invention.
Figure 5:
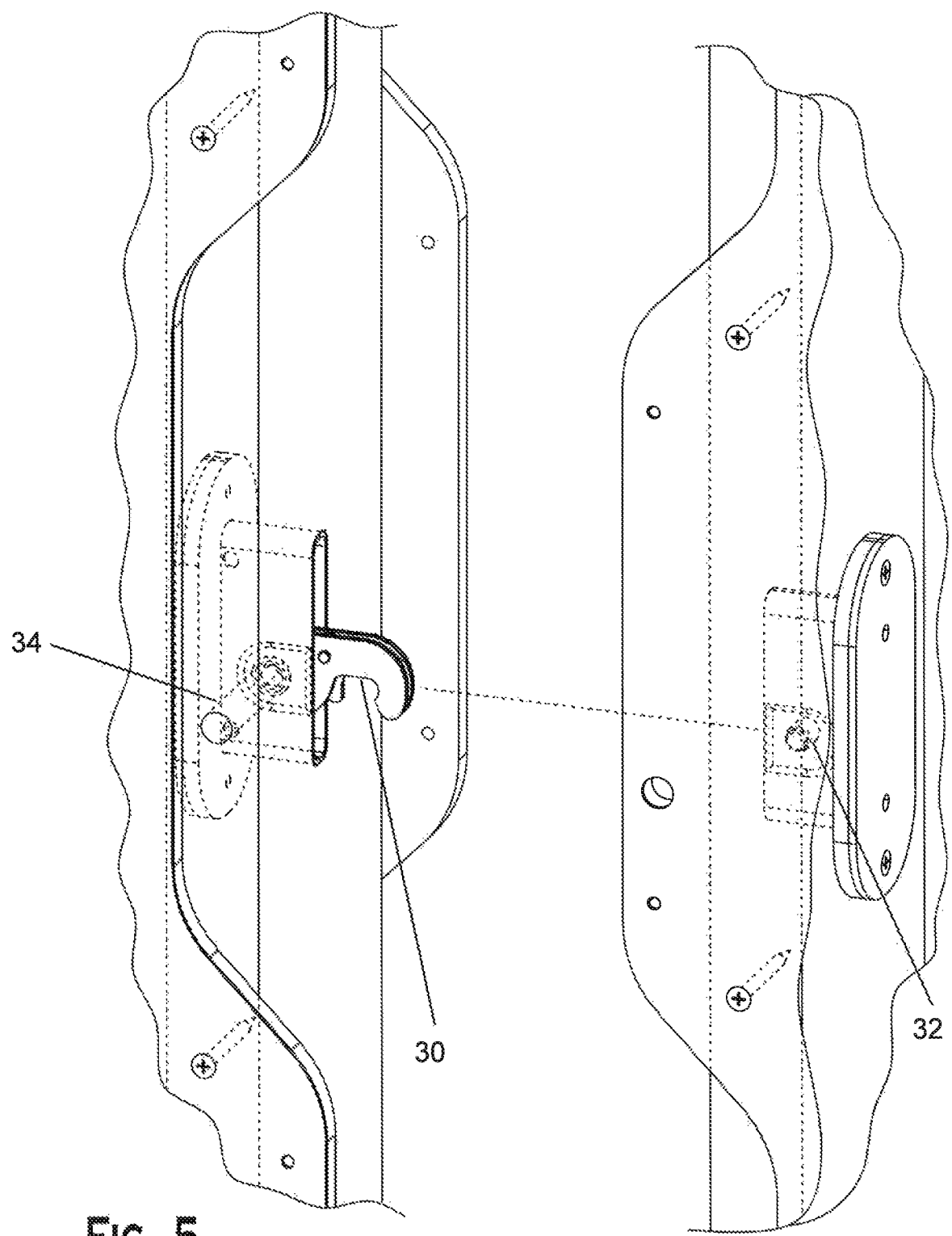
FIG. 5 is an expanded perspective view of the modular panels shown in FIG. 4, in position for connection.

Now with reference to FIG. 4, an exemplary embodiment for the connection of modular panels will be discussed. As depicted, each of the modular panels 10 have at least one end capable of connecting to an adjacent panel. The rightmost panel depicted in FIG. 4 is an end panel that connects on the left side to another modular panel, which in turn connects to yet another modular panel (partially depicted) further to the left. In this manner, multiple modular panels may be connected together to form a wall of any desired length, by connecting panels to achieve the desired dimensions. Furthermore, the width of the panels may be varied as well, so as to allow flexibility in design to achieve desired dimensions for the shelter. In FIG. 4, a female end stud 24 of the right end panel is configured to be joined to a male end stud 22 of the adjacent panel to the left. The male end stud 22 is characterized by having at least one male connector having at least one element capable of protruding from the male stud 22 towards and engageable with at least one portion of the female end stud 24. The female end stud is characterized by having at least one female connector having at least one element configured to receive or be secured to the male connector element. In an embodiment, the male connector of the male end stud 22, may be a hook 30 or draw cam, that may fit into a corresponding slot of the female end stud 24, or alternatively, the male connector element may rest against a pin 32 or receiving element of a female connector of the female stud 24. An exemplary male and female connector is depicted in FIG. 5, and will be discussed below. An alternative exemplary male and female connector in the form of a bolt and nut is discussed below with reference to FIG. 28, discussed below. As depicted in FIG. 4, there is provided a pair of connectors protruding from the male end stud, to be secured to a pair of female connectors of the female end stud. It is contemplated that more connectors may usefully be employed for greater strength, or for larger components. The connection mechanism may be any form of connector capable of securing the panels together, and will be discussed below. As depicted in FIG. 4, there are two complete modular panels shown, with the rightmost panel being an end panel, characterized in that it has only one side that connects in line with an adjoining panel. Contrasted with the adjacent panel that is configured to have connections made on both sides of the modular panel to other panels. The panels are provided with skins mounted on the outside 20 and inside 18 of the panel. Both of the skins 18, 20 substantially cover major face of the modular panels 10, but for desired openings to be maintained for installation of windows and doorways, and but for the adjoining edges of end studs of panels that are to be connected together. As can be seen in FIG. 4, where two panels 10 are to be joined, the skins have an edge at the joining surfaces that allows the adjacent skins to mesh together tightly and form an uninterrupted generally smooth surface, as multiple modular panels 10 are joined together, as depicted for example, in FIG. 2.

With reference to FIG. 4, the inside skin 18 for a first panel may present a first joining edge 36 extending along a length of the male end stud 22, the first joining edge having a pattern of protruding and recessed portions. In this instance, the inside skin 18 for the second panel presents a second joining edge 38 along the female end stud 24 that has substantially the inverse pattern of the first joining edge 36 of the first panel, such that as the first and second panels are approximated, the respective skins will complement each other. By "complement", it is meant that the opposing skin surfaces are provided with edge features, and as the opposing surfaces are approximated together, the edge features of opposing surfaces will fit together, without significant gaps or breaks between the respective skins. The outside skins may be similarly shaped and joined concurrently as the modular panels are approximated. In this manner, a first and second panel may be approximated, with their edge features complementary to each other to result in joined panels with no substantial gaps or openings between the panels, once secured relative to each other.

Figure 6:
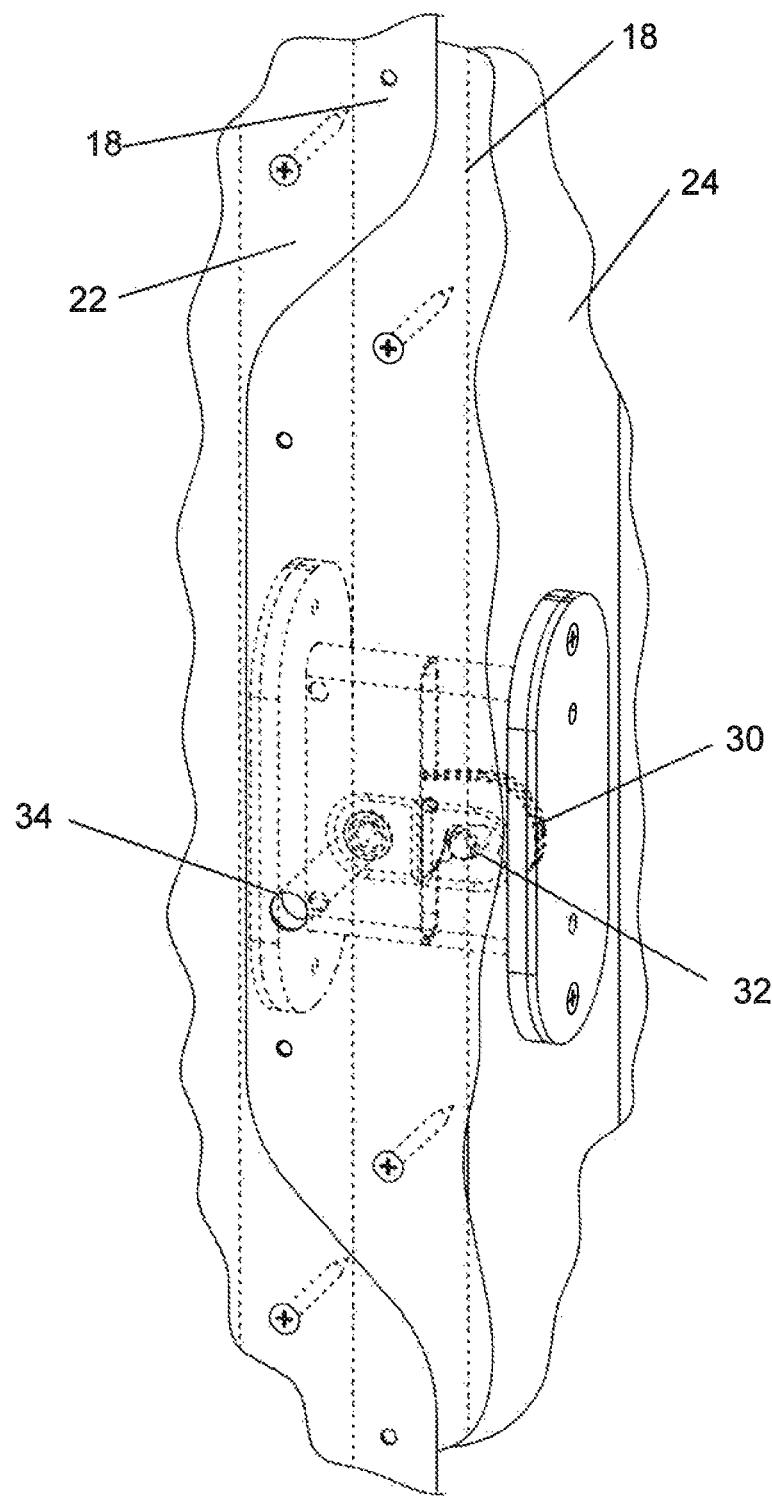
FIGS. 6-8 are side perspective views depicting internal details of an exemplary embodiment of the connection mechanism and the steps for securing a connection of the modular panels shown in FIG. 4.

For example, as can be seen in FIG. 4, and in greater detail in FIGS. 5 and 6, the protruding portions of the skin extend laterally beyond the dimensions of the end stud of the panel the skin is mounted to, and the recessed portions of the skin leaves exposed the side of the end stud. Thus, as the panels are approximated, the protruding portions of the first edge will at least partially lie over the end stud of the adjacent panel, in the regions that had been left open by the opposing edge's recessed portions, whereupon fasteners may be deployed through the skin of the first panel and into the end stud of the second panel, in order to secure the panels together. Such a fixation technique results in joined panels that are dimensionally accurate and precisely located with respect to adjoining panels in all three dimensions, and where the complementary features of adjoining edges ensure quick and accurate placement of the panels even by untrained installers, without requiring measuring, as the features of the adjoining surfaces urge the panels into correct positioning as the panels are approximated. Further, as multiple panels are joined together to complete a structure, or portion of a structure, the dimensional accuracy and precision is maintained for each of the joints between panels, ensuring that the cumulative error on the entire structure, featuring many joined panels, is minimized, and would be independent of the skill of the installer, due to the self-aligning connection of the panels.

In order to allow repeatably joining multiple panels together, the modular panels have a male end stud that presents a first joining edge with a first pattern. The opposite end of the first panel would have a female end stud that presents a second joining edge with a second pattern. Thus, by repeatably joining abutting panels where the male end stud is attached to a female end stud of an adjoining panel, it can be ensured that the skins of adjacent panels would complement each other.

As noted, in an embodiment, the end panels may only have to join to one other panel, and as shown in FIG. 4, one end of the panel would be complementary to the adjoining panel where the appropriate male or female edge could be selected, and the other end of the end panel would present a smooth edge, as shown. For panels other than end-panels, where the panel is to join on each end to adjacent panels, it is contemplated that each of the end would then be capable of joining to the adjacent panel, and may be provided with one, or both of the skins having waveform edges that facilitate joining to the neighboring panels.

Figure 38:
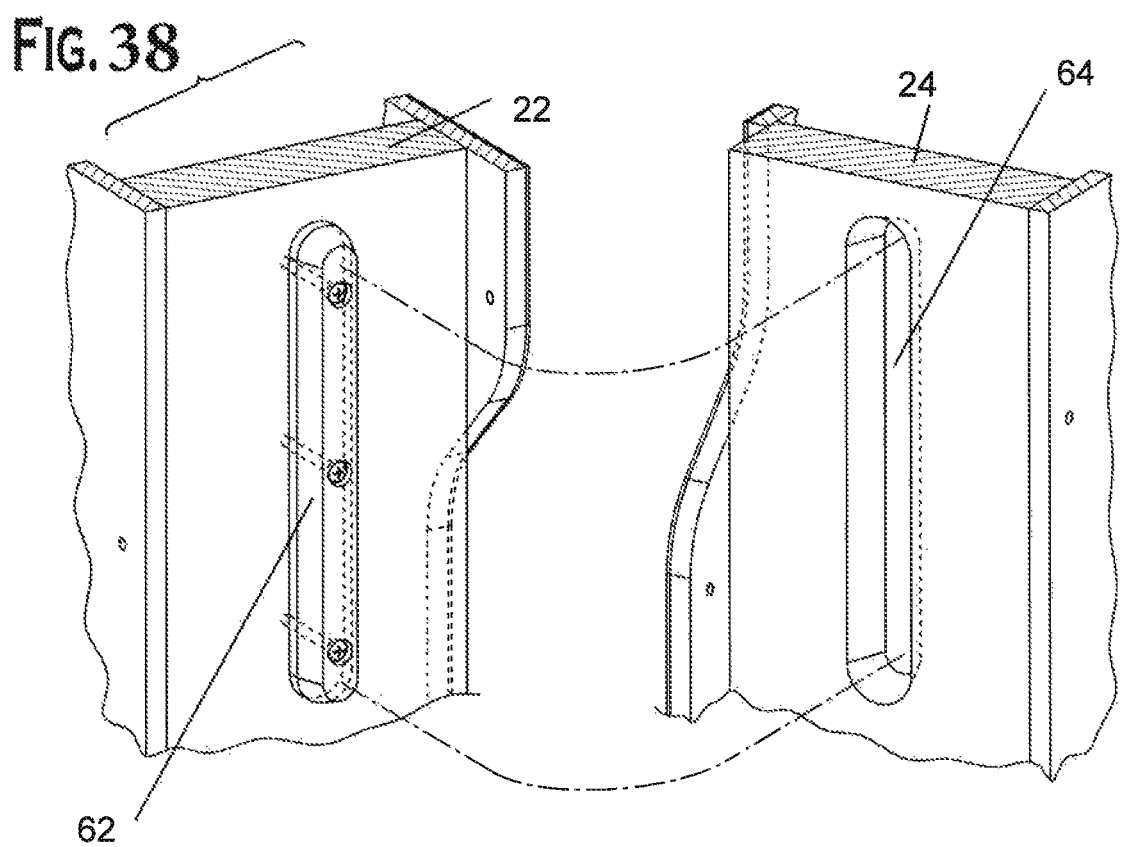
FIG. 38 is a partial sectional view depicting the location lug and recessed opening of adjoining end studs.
Figure 43:
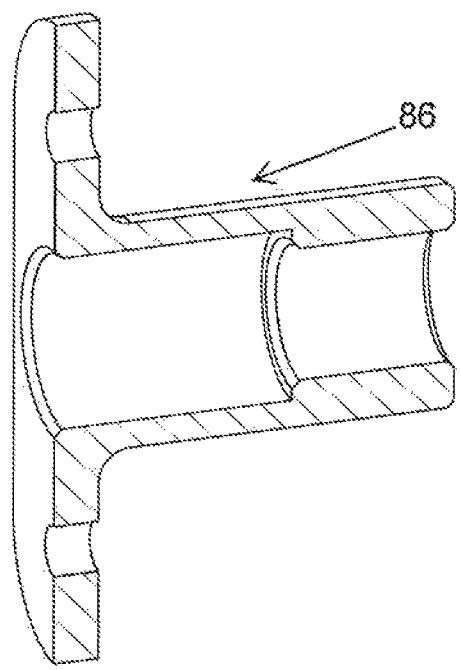

It is contemplated that various patterns are possible for joining either or both of the skins 18, 20 of adjacent panels together. As depicted in FIG. 4, each of the skins 18 and 20 may be provided with edges that are a waveform, where the centerline of the waveform generally aligns with the dimensional length of the outside edge of the end stud of the panel that the skin is mounted upon. In FIG. 4, the depicted waveform is trapezoidal, where the trapezoidal nature facilitates the approximation of the panels together, as the narrowing openings of the recessed portions of the edge encourage self-centering of the protruding portions as they are advanced towards the opposing panel. It is further contemplated that non-trapezoidal waveforms could be similarly employed, such as sinusoidal, square, rectangular, triangular, and sawtooth wave forms, as non-limiting examples. The rectangular and square waveforms would require a high degree of alignment of the panel edges as they are advanced into each other, where the sinusoidal, triangular and sawtooth patterns, as with the trapezoidal pattern depicted, would advantageously provide some self-registering tendencies as the edges are approximated, with the self-register aspect created by the interaction of the protruding portions of the first edge encountering the narrowing boundaries of the recessed portions of the second edge while being approximated together, and similarly for the protruding portions of the second edge encountering the narrowing boundaries of the recessed portions of the first edge. Notably, the various waveform edges described herein, having opposing complementary edges that conform to each other, serve to ensure that the panels may be approached together, and reliably indexed relative to each other to create a junction between adjacent panels that is highly accurate in dimensional placement. With multiple panels being joined together with reliable indexing, it is thus possible to achieve a large planar feature comprising multiple panels, such as wall, with high dimensional accuracy of the assembled panels as each of the panels are secured relative to each other, as will be discussed. Additionally, the waveform registration allows the user or constructor to merely place the panels near each other in rough alignment, and not precisely located; and as the panels are approximated together by one or more connection mechanisms being actuated, the panels will be aligned and urged into proper positioning relative to each other. Thus, as the panels are drawn together, in an embodiment, it is the edge features of the panels described herein that ensure dimensional accuracy of the assembled modular components comprising multiple panels, rather than the careful measurement and arrangement of the panels by the constructor. Alternatively, with reference to the exemplary embodiment of FIG. 38, the panels 10 may be provided with alternative registration features that may be provided on the panels to ensure accurate positional registration of adjoining panels, as will be discussed. By removing the need to measure and precisely align the panels, the level of skill required to construct the modular shelter is reduced, and further allows reduction in time required for construction of the modular shelter, as the panels are urged into proper placement as they are secured together, rather than requiring time consuming alignment prior to securement.

Figure 25:
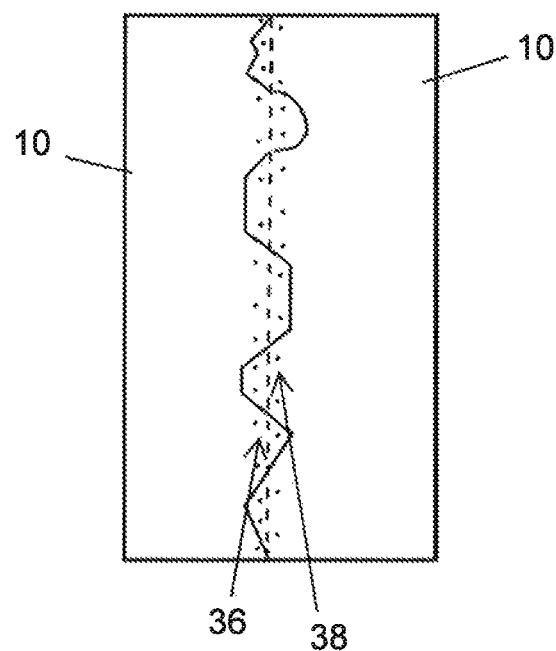
FIG. 25 depicts an alternative exemplary embodiment for connecting a pair of modular panels having complementary edges.

It is contemplated variations of waveform patterns may be provided, and that any combination of protruding and recessed portions are possible, so long as the protruding and recessed portions can be complemented in an inverse pattern by the opposing edge(s) of the panel to be joined. Thus it is further contemplated that by altering the waveform pattern to include a variety of shapes of protruding, and recessed elements, configured to receive the corresponding edge of an adjoining panel, the combination of waveform elements could form a keyed relationship, where only the correct panels may be approximated together, and thereby prevent approximation of the incorrect panels. The system may thus be provided in a manner that allows for control of panels fitting together, whether for aesthetic, efficiency, or safety in construction of the modular shelter, as the keyed relationship of the panels may ensure fidelity to the specified design, as only the intended panels would be capable of being joined together. As a non-limiting example, to create a keyed panel the limits interchangeability of panels for connecting, there may be provided a first panel having at least a first waveform feature over a first portion of the edge, and having a second or more different waveforms featured over a second or more portions of the edge. It is contemplated that multiple waveform features (each comprising one of a protruding or recessed areas) may be provided to make up a keyed waveform edge, and further the waveform features may be repeating pattern, or non-repeating format. Such a keyed panel could only be secured to a panel having the appropriate complementary edge. By varying the combinations of waveform portions provided, or even the dimensions of the waveform portions, it is possible to create a combination that is unique to each panel junction, and could effectively prevent construction mistakes where the incorrect panels are joined together. As a non-limiting example, a representative depiction of joined panels having exemplary keyed edges is depicted in FIG. 25, having a first edge 36 and a complementary second edge 38, where the edge features are varied over the length of the joint to create a unique pattern. In the depicted exemplary embodiment, there is provided (from top to bottom) a double peaked wave portion, a sinusoidal wave portion, varying trapezoidal wave portions, and varying sawtoothed wave portions. It is contemplated that, relying on the teaching herein, one may envision alternative combinations and forms of waveform patterns comprising protruding and recessed portions that may be provided, where the complementary edges having one or more of the exemplary wave forms contemplated herein, and keep within the intent of the disclosure. By mixing the dimensions and form of wave portion, the design may limit compatibility of panels, as needed. The various complementary edge combinations possible would then be numerous, as one may select to vary any one or more of, for any one wave portion of the waveform edge, variable aspects of the wave form portion, including: protruding or recessed wave form portion; the type or shape of the waveform provided in any suitable form (e.g., sinusoidal, sawtooth, trapezoidal, irregular shapes, an may optionally be provided in regular patterns, or irregular patterns, etc.); the amplitude of the wave portion, such as the depth to which the panels would engage; and the frequency of the wave portion, such as the width of the engaged portions. It is contemplated that each wave portion of the waveform may selectively be controlled to be of a desired shape, and thereby ensure that each panel edge configured to interlock with another panel, as described herein, can only then be secured relative to the correct panel providing the complementary edge features, even where the number of panel joint types is very high. In an exemplary embodiment, the system may provide for a relatively small number of panel joint types, approximately 1-15, that may be needed, and the various panels may be provided as a group with multiple members that are each interchangeable with other panels in the same group of joint types, such that any member of a first group could be matched with any member of a complementary group of panels, and a second group could be matched with any member of a second complementary group of panels, and so forth as additional groups as needed, thus it may be possible to assemble a structure using a small number of panel types that fall into groups or complementary groups, each having specific edge configurations.

As a non-limiting example, a first group may have one type of waveform portions making the edge, and a second group may be provided with a different type of waveform portions, as may result from varying the waveform portions in either size, shape, amplitude, or frequency, as discussed above. In this manner, a smaller number of combinations are possible, but still presenting an edge that has a single type of waveform in a consistent repeating pattern over the adjoining edge of the panel.

In an exemplary embodiment, the waveform portions forming the edges 36, 38 of adjoining panels 10 may aid in providing only partial alignment of adjoining panels, as may occur, for example, where the waveform edges of adjoining panels are provided with a more forgiving or wider degree of tolerance as the opposing edges 36, 38 engage with each other as the panels 10 are approximated, as has been described above. In such an embodiment, enhanced alignment may be ensured by providing alternative registration features that provide accurate positional registration and alignment for each of the end studs to be joined together, where the alternative registration features physically engage and provide a precise fit that ensures accurate alignment and positional registration of the adjoined panels 10, relative to each other. An exemplary embodiment of alternative registration features can be seen with reference to FIG. 38, having an alternative registration feature that is a spline shaped lug that is configured to be received within a complementary shaped opening of an adjacent panel, as the panels are approximated. In an exemplary embodiment, the panel 10, may optionally be provided with at least one protruding location lug 62, configured as a body protruding out form the male end stud 22. In such an embodiment, the corresponding female end stud 24 of the adjoining panel 10 may be provided with a corresponding recessed opening 64 that receives the protruding body of the location lug 62 of the adjoining panel. In an embodiment, the location lug may be provided with a tapered body, for example, as shown in FIG.

37. The tapered body of the location lug 62 and correspondingly tapered recessed opening 64 will thus provide self-centering of the location lug 62 within the recessed opening 64 as the panels are approximated, as depicted in FIGS. 31-34 depicting the sequence for assembling adjoin panels, discussed below. As the two panels are brought closer together, the tapered body of the location lug 62 as it enters into, then extends further into the interior of the recessed opening 64, will be caused to be centered within the correspondingly tapered recessed opening, thereby urging adjoining panels into alignment and positional registration at a level of precision that is suitable for the construction of the modular shelter. The positional alignment and registration may be further enhanced or maintained as the connector mechanism, discussed below, is caused to tightly secure the two edges of the panels together.

One skilled in the art will recognize that the teachings herein to provide examples, and the various components described herein may be provided in alternative configurations that fall within the spirit of the invention. For, example, it is contemplated that the location lug 62 and recessed opening 64 of the alternative registration feature may instead be provided in a configuration where a location lug 62 is protruding from a female end stud 24, and the recessed opening 64 is provided on the male end stud 22. In an embodiment where the adjoining panels 10 feature a plurality of alternative registration features, it is contemplated that the plurality of location lugs 62 may all be provided on one of the end studs, whether male or female, and the plurality of recessed openings 64 may all be provided on the complementary adjoining end stud whether male or female, as appropriate. Alternatively, in an embodiment having a plurality of alternative registration features, there may be at least one location lug and at least one recessed openings on one stud (male or female), and the complementary mix of recessed opening(s) and location lug(s) provided on the complementary end stud (male or female, as appropriate).

The location lug 62 may be any suitable material, such as metal, polymer, wood, as non-limiting examples. In an embodiment, the location lug is a polymer material, and may be polyoxymethylene (POM), nylon, Polyphenylene sulfide (PPS), polyamideimide (PAI), polyetheretherketone (PEEK), or polyethylene, such as low-density polyethylene (LDPE) or high-density polyethylene (HDPE), as non-limiting examples. The polymer of the location lug may optionally be glass or fiber filled.

The corresponding recessed opening 64 is positioned in the end stud to receive the location lug 62 as the panels are approximated. The recessed opening 64 may be a cavity formed in the end stud, and preferably provided with a inwardly tapered sidewall matching the taper of the location lug, such that the dimensions of the recessed opening reduce as the location lug is extended further into the recessed opening. In this manner, the tolerance to mis-alignment of the two panels to be joined together is smoothly reduced as the panels are approximated. In an embodiment, the recessed opening 64 may be an insert inserted into a mortise in the end stud, such as metal, or polymer insert having a formed recess that is shaped to receive the location lug 62, and may be accurately fitted into a mortise in the end stud. Alternatively, the recessed opening may be a tapered mortise provided in the female end stud. The tapered body of the protruding location lug may be of any suitable tapered body shape, for example, a frustum of a circular or oval cone, a frustum of a pyramid, such as a square or rectangular pyramid or other prism. In an embodiment, the protruding location lug may be a portion of, or a frustum of a sphere or right cylinder. In an embodiment, the location lug may be a trapezoidal prism. In an embodiment, the tapered body may be provided with some or all of the edges of the tapered body being smoothed or having rounded over edges that facilitate smooth predictable sliding movement of the location lug 62 within the corresponding recessed opening 64. In an embodiment having location lugs, the location lug and recessed opening cooperate when joined to provide positive location registration, to ensure that adjoining panels are precisely aligned in multiple dimensions. In such an embodiment, one or more location lugs and complementary recessed openings may be provided at the junction of a male and female end stud of adjoining panels. Similar junctions can be provided at additional panels, in order to quickly extend the wall construction with multiple panels being secured together, with proper alignment, for the construction of the modular shelter, without requiring careful measurement and placement of the wall panels, as by tightening the connectors, as described below, the panels will be urged into proper alignment. As with the keyed waveforms, described above, that can be utilized to prevent mismatch of panels, it is contemplated that the location lugs 62 and recessed openings 64 may be controllably varied, such as by varying one or more of placement locations, shapes (e.g., pyramid, cone frustum), size or taper dimensions of the location lug and recessed openings to ensure that only appropriate panels are able to be joined to the corresponding panels.

As depicted in the exemplary embodiment of FIG. 5, each of the end studs of the adjoining panels may be fitted with a component of a connector mechanism. In an embodiment, the connector mechanism may be a blind panel connector, such as a draw latch or coffin lock, where the male portion of the blind panel connector is secured within the male end stud 22, and the female portion of the blind panel connector is secured within the female end stud 24. As depicted, each of the components of the connector mechanism may fit into a mortise in the respective end stud 22,24, The connector mechanism depicted is a hook and pin connector that when actuated, such as by rotation of a key 44 draw the panels together and securely lock the panels in place relative to each other. It is contemplated that alternative forms of connector mechanisms may be provided, such as a draw latch, or any connector mechanism suitable for approximating components together, such as by the provision of a cam and acceptor arrangement, or a threaded bolt/nut engagement, as known to those skilled in the art. Thus, the use of the connector mechanism can ensure that the panels may be placed in proximity to each other, and the connector mechanism maybe actuated to ensure that the panels are tightly drawn together, and secured in place relative to each other with precision. It is further contemplated that multiple connector mechanisms may be utilized to securely connect a male and female end stud, to effect the joining of two panels.

It is recognized that alternative connectors may be employed to draw panels together and secure them in place relative to each other, for example the use of threaded fasteners or threaded rod passing through the end studs of adjoining panels, and secured with nuts that engage the threads and may be tightened down to draw and lock the adjoining panels together, for example, as can be seen with reference to FIGS. 28-36, discussed below. Alternatively, traditional fasteners, such as screws, and nails may be similarly deployed. If necessary, openings may be provided in or both skins of the panels and may allow access to tighten or deploy the fasteners to secure the panels together. Regardless of the connection method, the use of adhesives may be employed where the structure will not need to be dismantled after use.

Figure 28:
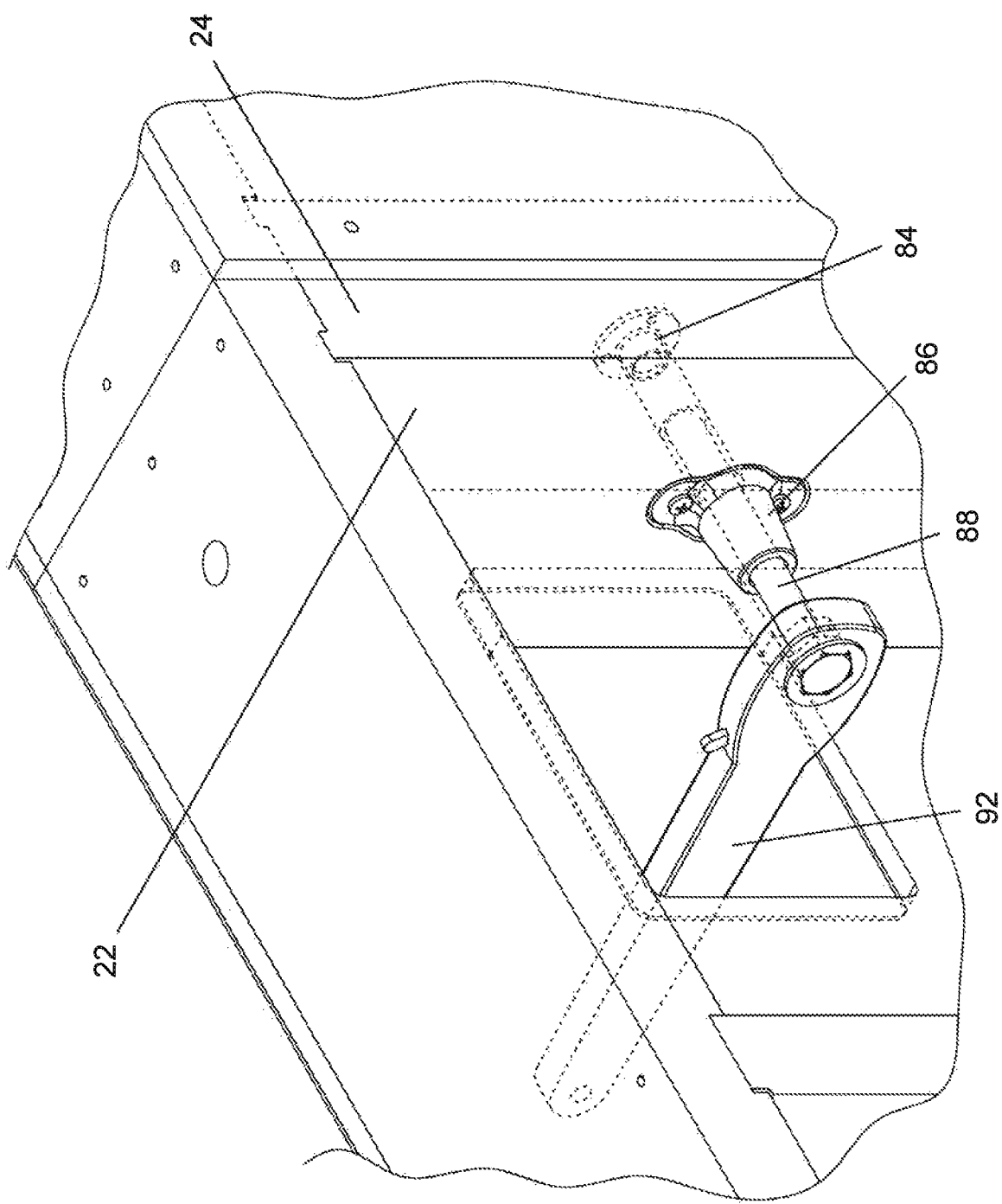
FIG. 28 depicts an expanded perspective view of an exemplary embodiment of a connector being deployed.
Figure 29:
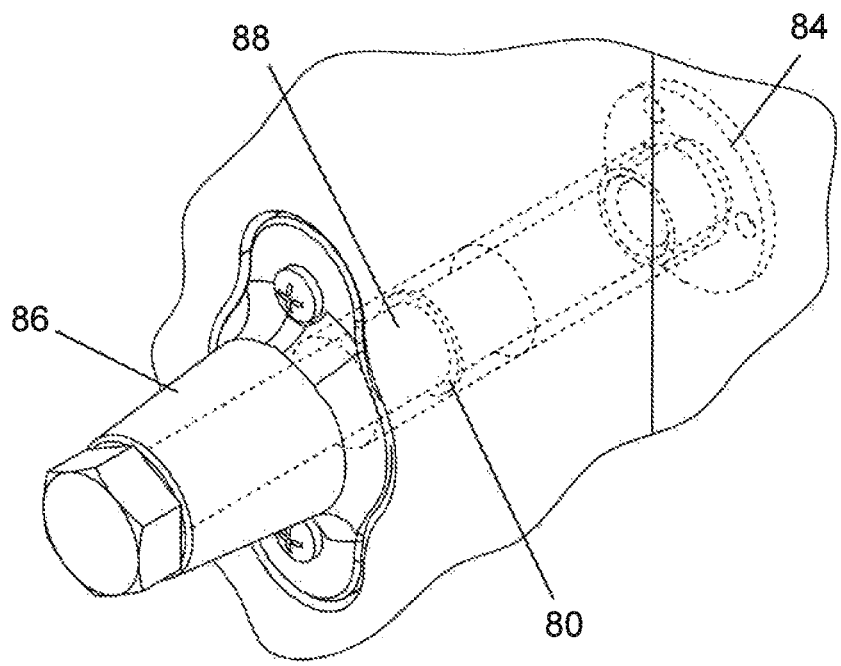
FIG. 29 depicts an expanded perspective view of an alternative connector, according to an exemplary embodiment of the invention.

In an exemplary embodiment, and as can be seen with reference to FIG. 29, at least one alternative connector may be provided having a male connector element in the form of a captive bolt assembly 82 that is secured to a male end stud 22 of one panel 10, and a corresponding female connector element in the form of a captive nut, such as a tee-nut 84 secured to a female end stud 24 of another adjacent panel 10. The captive bolt assembly 82 may be deployed where the threaded end of the captive bolt 88 is to be aligned with, and received in the T-nut 84 secured to a female end stud of an adjacent panel, as depicted in FIG. 28. In such an embodiment, the captive bolt assembly 82 has a bolt 88 and flange 86, where the body of the bolt 88 is directed through an opening in the flange 86 that is to be secured to the male end stud 22 of a panel 10. The flange 86 may be secured to the inside dimension of the male end stud 22, or alternatively, may be fit into a mortise within the male end stud 22, as shown in FIG. 28. The body of the bolt 88 can further be directed through the male end stud 22, and at least the threaded portion of the bolt is to protrude from the male end stud 22 to be received within a correspondingly threaded portion of a female connector element in the form of tee-nut 84. It is recognized that other threaded fastener receivers may be provided, such as a nut, optionally with a washer that can capture the bolt and can pull the female end stud toward the male end stud as the connector is tightened, as will be discussed.

Figure 44:
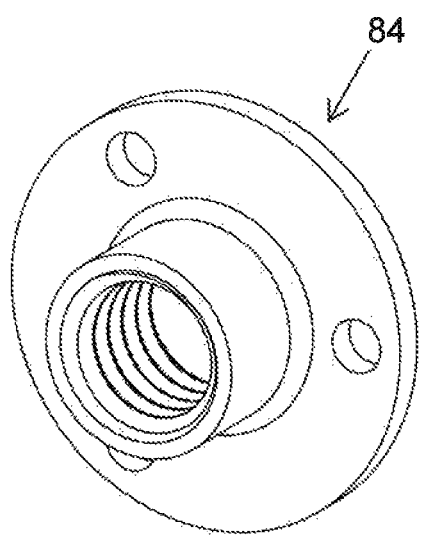
FIGS. 44-45 are enlarged perspective and cross-section views, respectively, of a tee-nut female connector, according to an exemplary embodiment of the invention.
Figure 45:
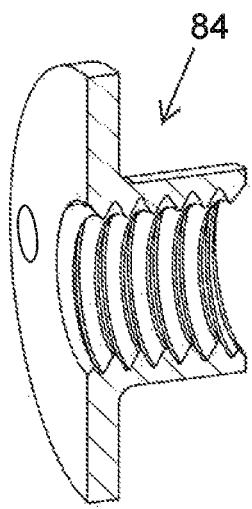
Figure 46:
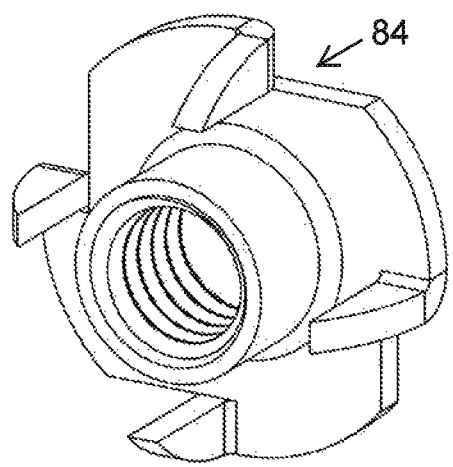
FIG. 46 is an enlarged perspective view of an alternative tee-nut female connector, according to an exemplary embodiment of the invention.

With reference to FIGS. 28 and 29, a tee-nut 84 is shown being deployed as part of a connection mechanism, and is placed against a female end stud 24 of a panel 10. Details of the tee-nut 84 can be seen with reference to FIG. 44 and in cross-section view of FIG. 45. The tee-nut 84 has an internally threaded collar portion directed into an opening in the end stud, and an integral washer portion, with one or more holes in the washer portion through which a fastener (e.g. screw, nail) may be deployed to secure the tee-nut 84 to the female end stud 24. Alternatively, as shown in FIG. 46, the tee-nut 84 may be provided with one or more prongs that can engage with the female end stud 24, such that the tee-nut 84 can be secured by being pressed against the end stud, without requiring additional fasteners. As shown in FIG. 46, the prongs are protruding from the integrated washer portion of the tee-nut.

Figure 35:
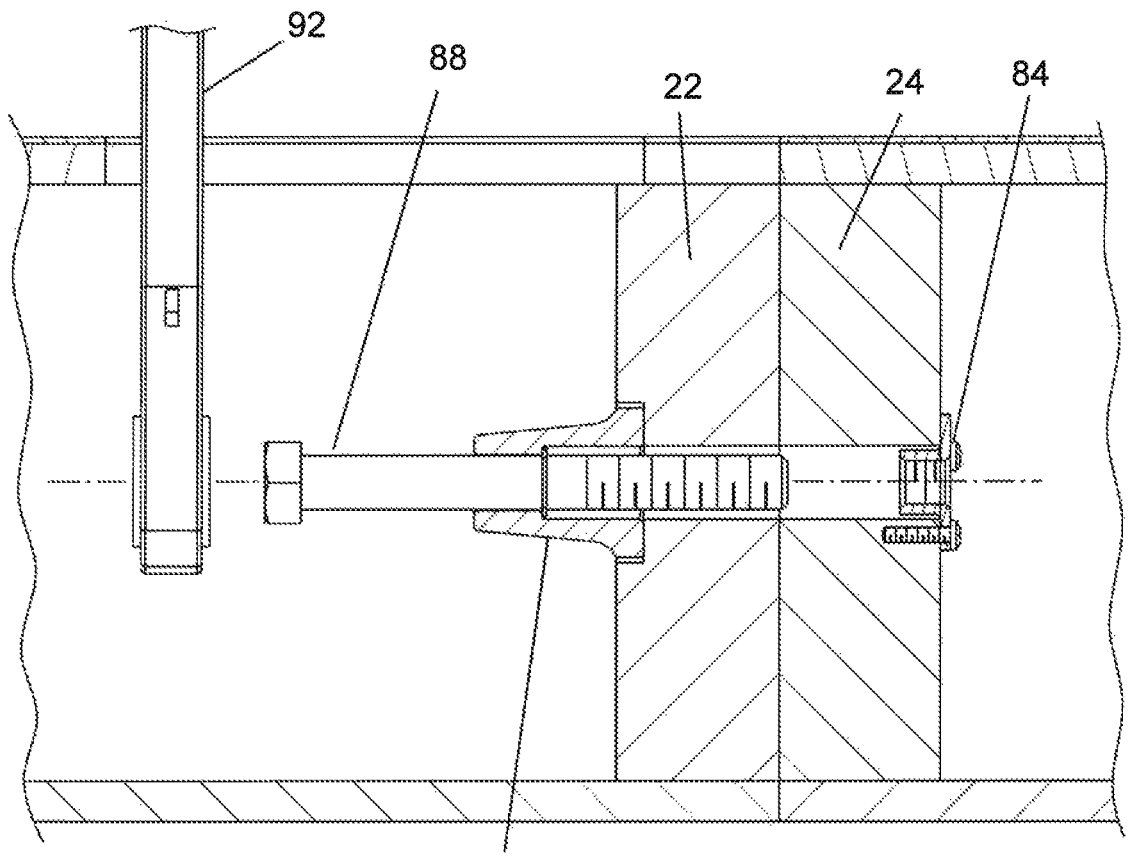
FIG. 35 is a partial sectional view in cross-section of the end studs of the modular panels and connector of FIG. 33, taken along line 35-35.
Figure 36:
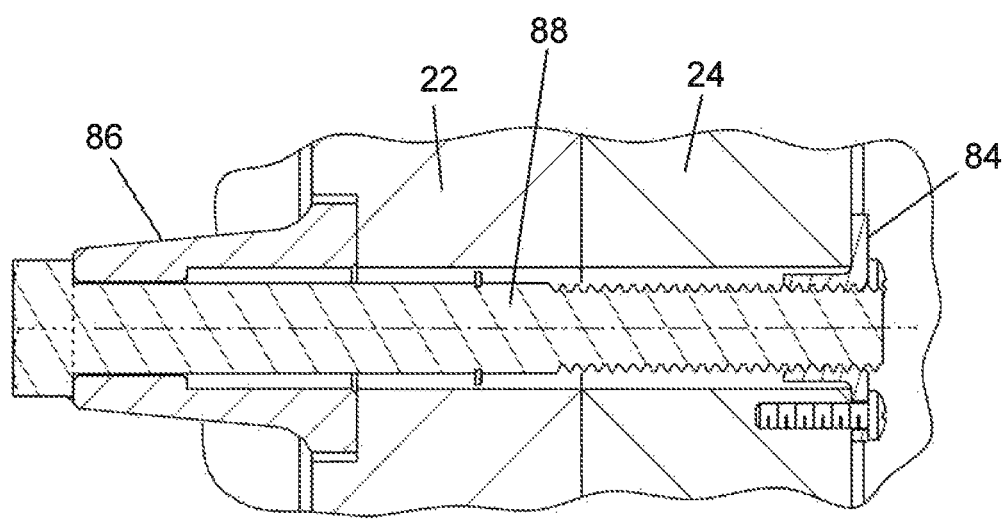
FIG. 36 is a partial sectional view in cross-section of the end studs of the modular panels and connector of FIG. 34, taken along line 36-36.
Figure 37:
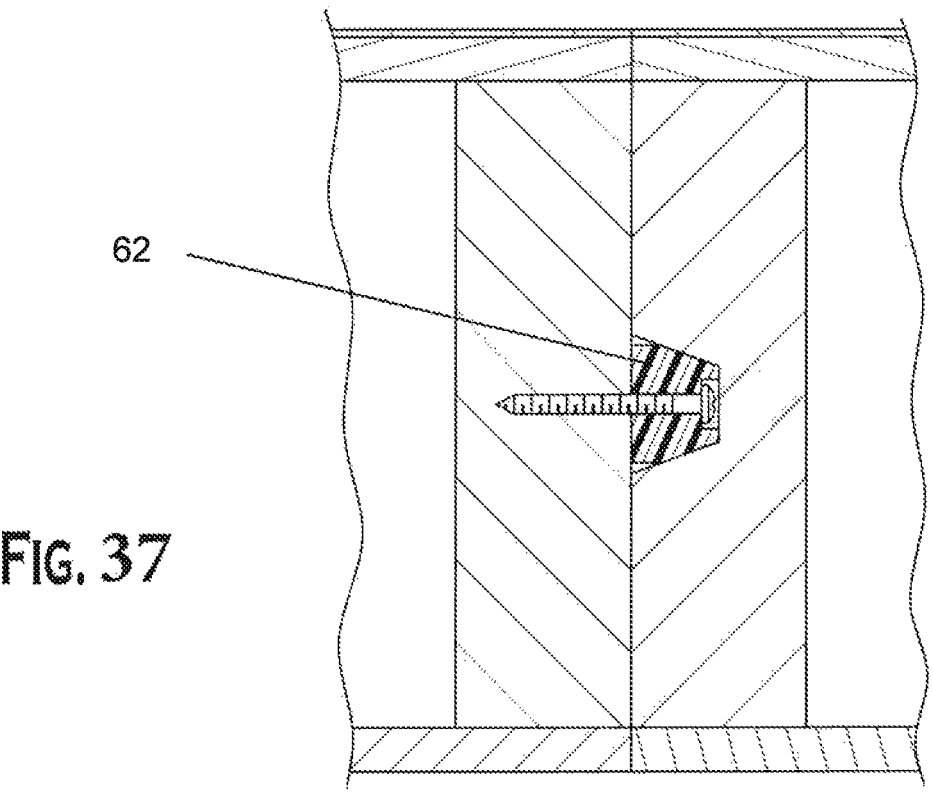
FIG. 37 is a partial sectional view in cross-section of the end studs of the modular panels and location lug of FIG. 34, taken along line 37-37.

As shown in FIGS. 35 and 36, the alternative connection mechanism connection can selectively be engaged and disengaged. FIG. 35 depicts the alternative connection mechanism in a disengaged state, where the male connection element is in place against the male end stud 22, but with the threads of the bolt 88 not engaged with the threaded portion of the tee-nut 84 that is in place in the female end stud 24. In FIG. 36, the alternative connection mechanism is shown in an engaged state, where the bolt 88 has been threaded into the t-nut 84, and tightened to securely maintain the adjoining panels together. The connection between the bolt 88 and the tee-nut 84 can be made by directing the threaded portion of the bolt 88 into the internally threaded collar portion of the t-nut 84, where continued rotation of the bolt 88, such accomplished with a suitable tool, such as wrench 92, preferably a ratcheting wrench as shown, applied against the head of the bolt 88, will drive the bolt head towards the t-nut 84 as the bolt 88 is rotated and the threaded portions of the tee-nut and bolt are caused to become further engaged. In this manner, as the bolt 88 is tightened within the tee-nut 84, the head of the bolt 88 is drawn against the flange 86, which in turn rests against male end stud 22 of the left panel 10. Continued tightening of the threads of the bolt 88 into the tee-nut 84 will draw the bolt 88 and the t-nut 84 together. The internal washer is thus urged against the female end stud 24, and thereby draws each of the male and female end studs 22, 24 of the adjoining panels 10 together and applying compression against both end studs to secure the panels tightly together. Furthermore, as the panels are drawn together, the edges of opposing skin surfaces are engaged together (as has been described previously), and/or location lugs 62 are received within complementary recessed openings 64 (as described previously), to provide additional positive registration and alignment of the panels 10.

Figure 30:
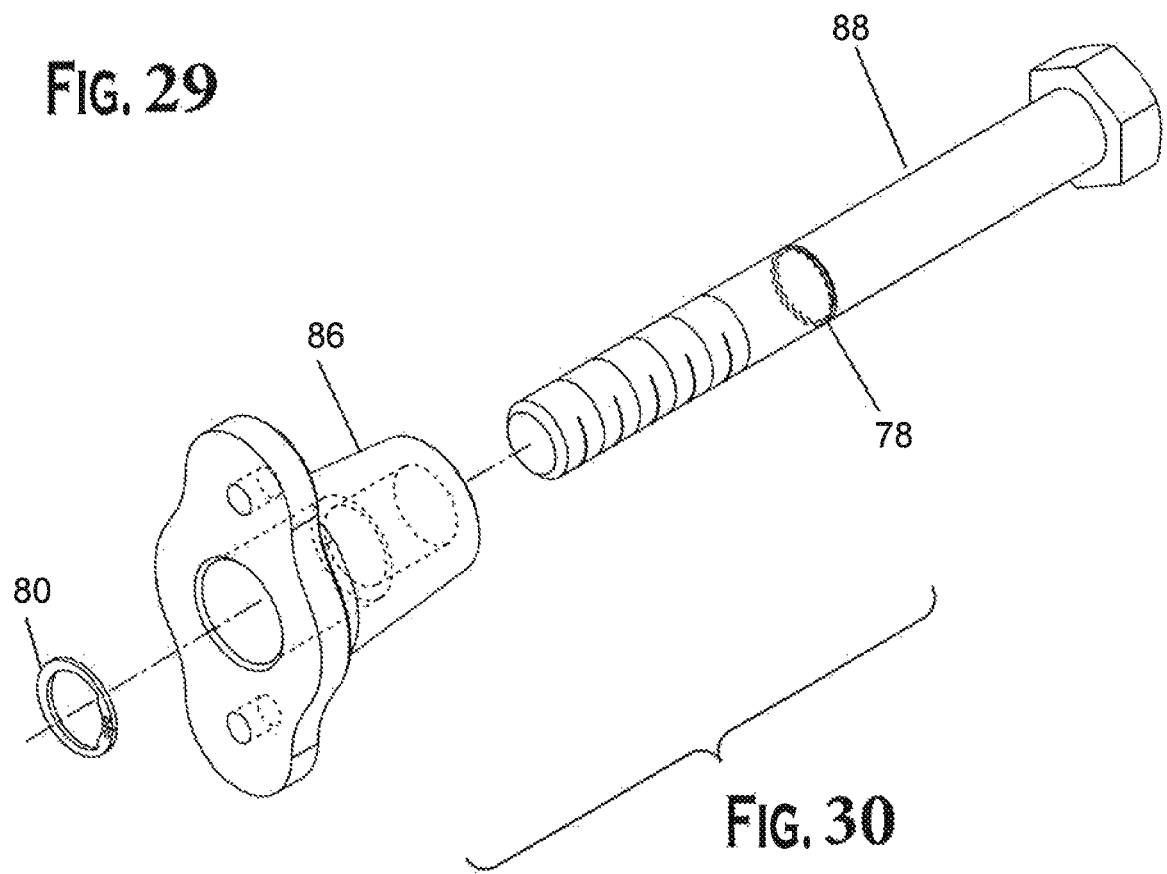
FIG. 30 depicts an exploded view of a male connector element, according to an exemplary embodiment of the invention.
Figure 31:
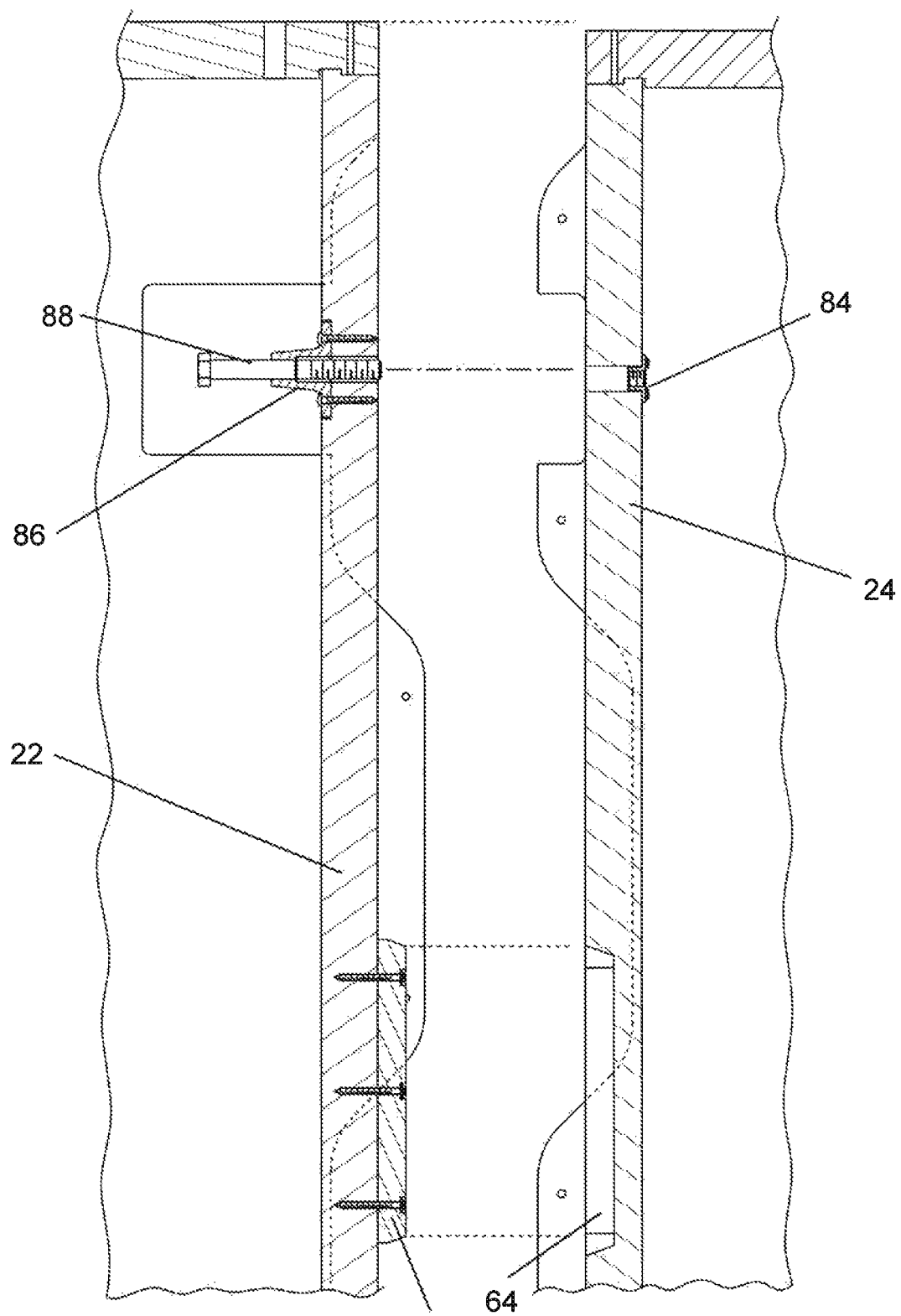
FIG. 31-34 depict a sequence of orthogonal partial sectional views depicting the connection of panels according to an exemplary embodiment of the invention.

In an embodiment, the bolt 88 may optionally be made captive within the flange 86 by the use of a c-clip 80 that is engaged in a groove 78 around a portion of the body of the bolt 88, such that the c-clip 80 can fit within the interior of the flange 86, but is unable to be retracted out of the flange 86, nor can the head of the bolt 88 fit through the narrow opening of the flange 86, thereby securing the bolt 88 to the flange 86 in a captive fashion, yet still allowing lateral movement of the bolt, as will be familiar to those of skill in the art. An exploded view of the male connector 82 of the alternative connector is shown in FIG. 30, where the C-clip 80 and the groove 78 are depicted. In FIG. 29, the C-clip 80 can be seen residing within the groove on the body of the bolt, such that the C-clip is fixed in position relative to the bolt 88 such that the C-clip is unable to slide along the length of the bolt.

Details of the flange 86 can be seen with reference to FIGS. 39-41. The flange 86 has a flange collar protruding away from a flange base, with an opening passing therethrough for receiving the bolt 88. The flange base may be provided with one or more holes through which fasteners (such as screws or nails) may be deployed to secure the fastener to the end stud. The flange collar may present a tapered exterior surface, or alternatively, as shown in the alternative flange embodiment of FIG. 42, the flange collar may be columnar, such that the flange base can be provided with narrower dimensions. At the end of the flange collar away from the flange base, there is provided an opening that is sized to receive the body of the bolt 88, but prevent passage of the head of the bolt through the opening. At the end of the flange collar closest to the base, the opening may be somewhat larger than the end opening. Within the bolt receiving passageway, there may be step down in size, which creates a limitation on passage of the C-clip 80 towards the end opening, and thus retains the bolt captive within the flange 86 where the C-clip 80 is in place within the groove 78 of the bolt 88.

Now with reference to FIGS. 4-8, the practice of joining adjacent panels together will be discussed. The first panel with a male end stud 22 is generally aligned vertically and generally in the same plane with the second panel having the female end stud 24, and approximated together, such that the complementary edges of the interior and exterior skins 18, 20 of the first and second panels respectively mesh together. The positioning of the panels relative to each other for approximation can easily be performed by one or two people, where the panel are sized such that they can be moved without lifting or moving equipment. In practice, the panels may be positioned such that the skins may be partially meshed together, and will tend to stay in place relative to each other, and may self-stand in many cases, allowing the operation of the connector mechanism, as will be described.

Figures 7, 8:
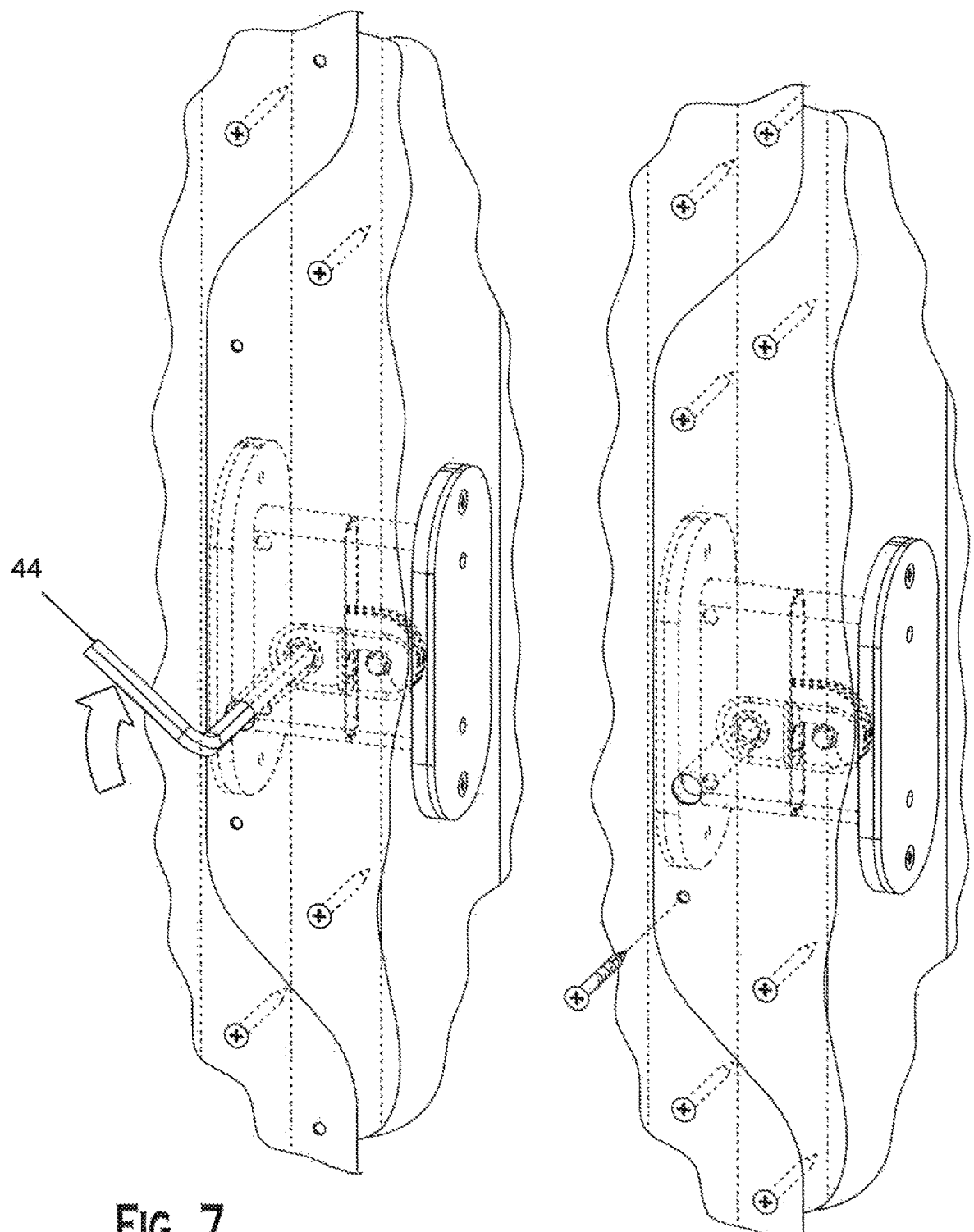

The connector mechanism consists of a male connector on the male end stud of a first panel, and a female connector on the female end stud of the second panel. The male connector may be any suitable connector and may be, for example as depicted in FIG. 5, a hook 30 that is directed towards the female connector, which may be, for example, pin 32, as depicted in FIG. 5. As shown in FIG. 6, the hook 30 is loosely hooked around the pin 32. A key 44, which may be a tool, such as a hex tool, or screwdriver, as non-limiting examples, is to be inserted through a key hole 34 passing through the skin 18, and a portion of the male end stud 22 to access the drive element 46 of the male portion of the connector mechanism within the male end stud 22. As shown in FIG. 7, the key 44 engages the drive element, as the key is rotated to draw the panels together, as will be discussed with reference to FIGS. 9 and 10, and securely lock the panels to each other as the connector mechanism is actuated to tightly pull the panels together. As depicted in FIG. 8, additional fasteners may then be deployed through the projecting portion of the skin of one panel, and into the stud of the other panel, thereby proving multiple points of securement holding the panels together, as will be discussed.

Figure 9:
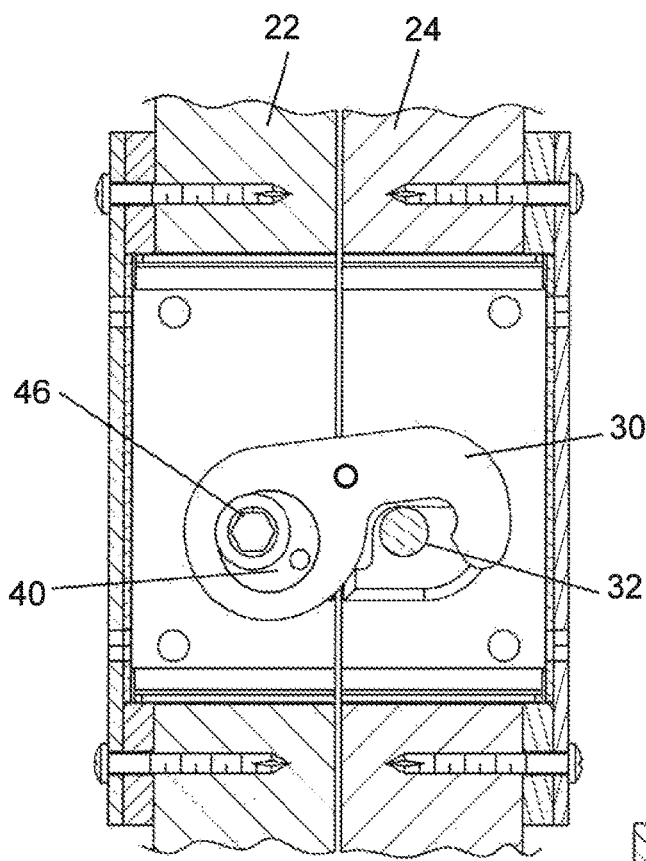
FIGS. 9 and 10 are expanded sectional side orthogonal views detailing the connection mechanism shown in FIG. 6.
Figure 10:
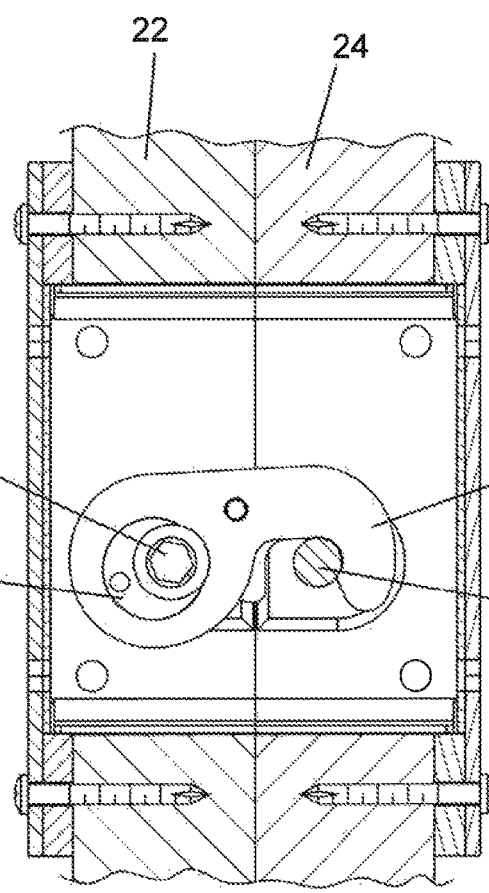

FIGS. 9 and 10 depict details of the connector mechanism in a section view. As mentioned with reference to FIG. 8, the hook 30 of the male portion of the connector mechanism may be resting loosely over the pin 32 of the female portion of the connector mechanism. As the key 44, depicted in FIG. 7, is turned within the drive element 46 of the connector mechanism, the hook 30 is urged against the pin, and further rotation of the drive element results in the cam 40, visible in FIGS. 9 and 10 being turned and as it rotates eccentrically about the axis of the drive element 46, the cam 40 urges the offsetting of the hook element 30 to the left, as depicted in FIG. 10, such that the female end stud 24 is drawn tighter against the male end stud 22, thereby reducing any gap remaining between adjoined panels.

Figure 26:
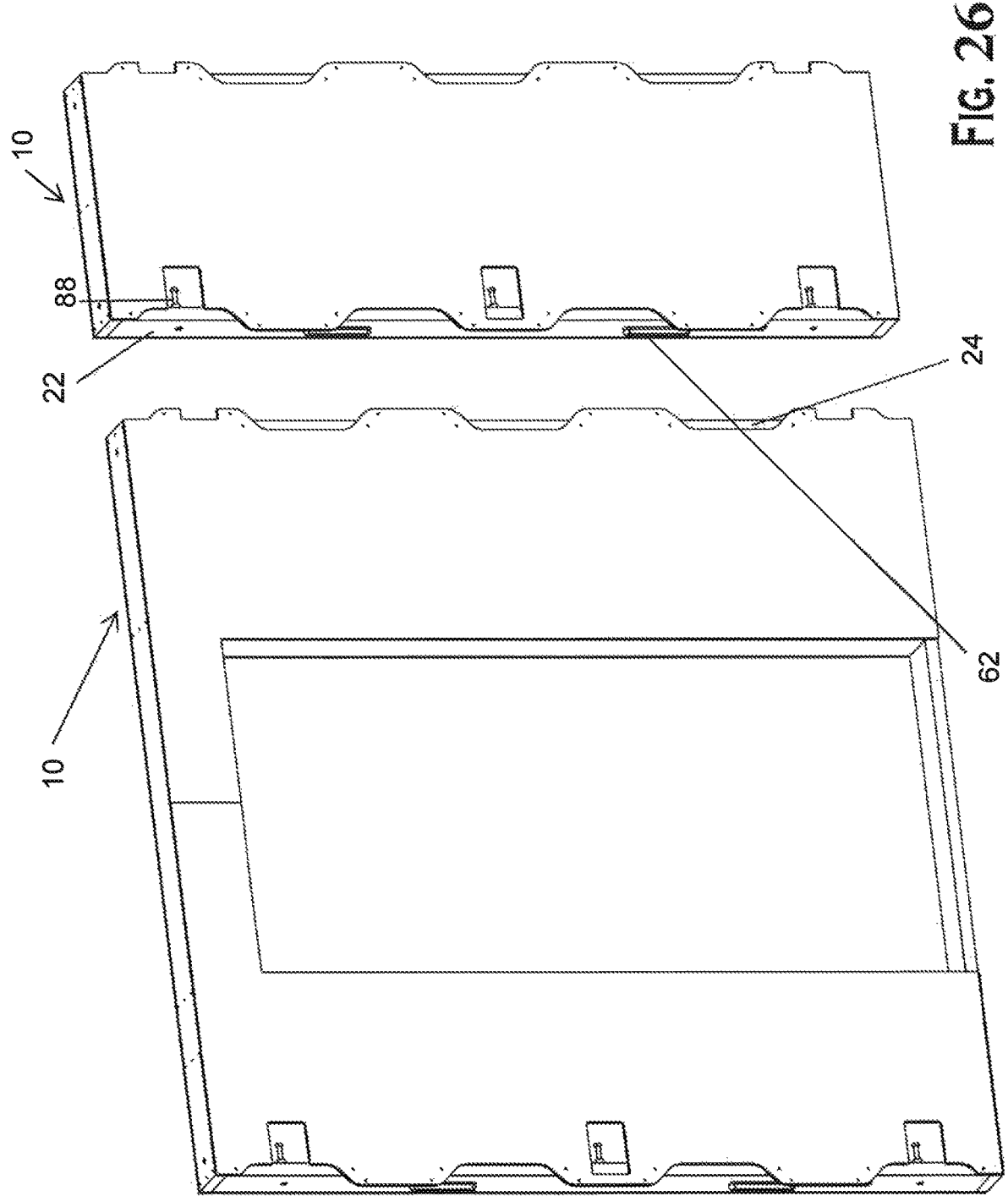
FIGS. 26 and 27 depict perspective views of the modular panels to be connected, according to an exemplary embodiment the invention.
Figure 27:
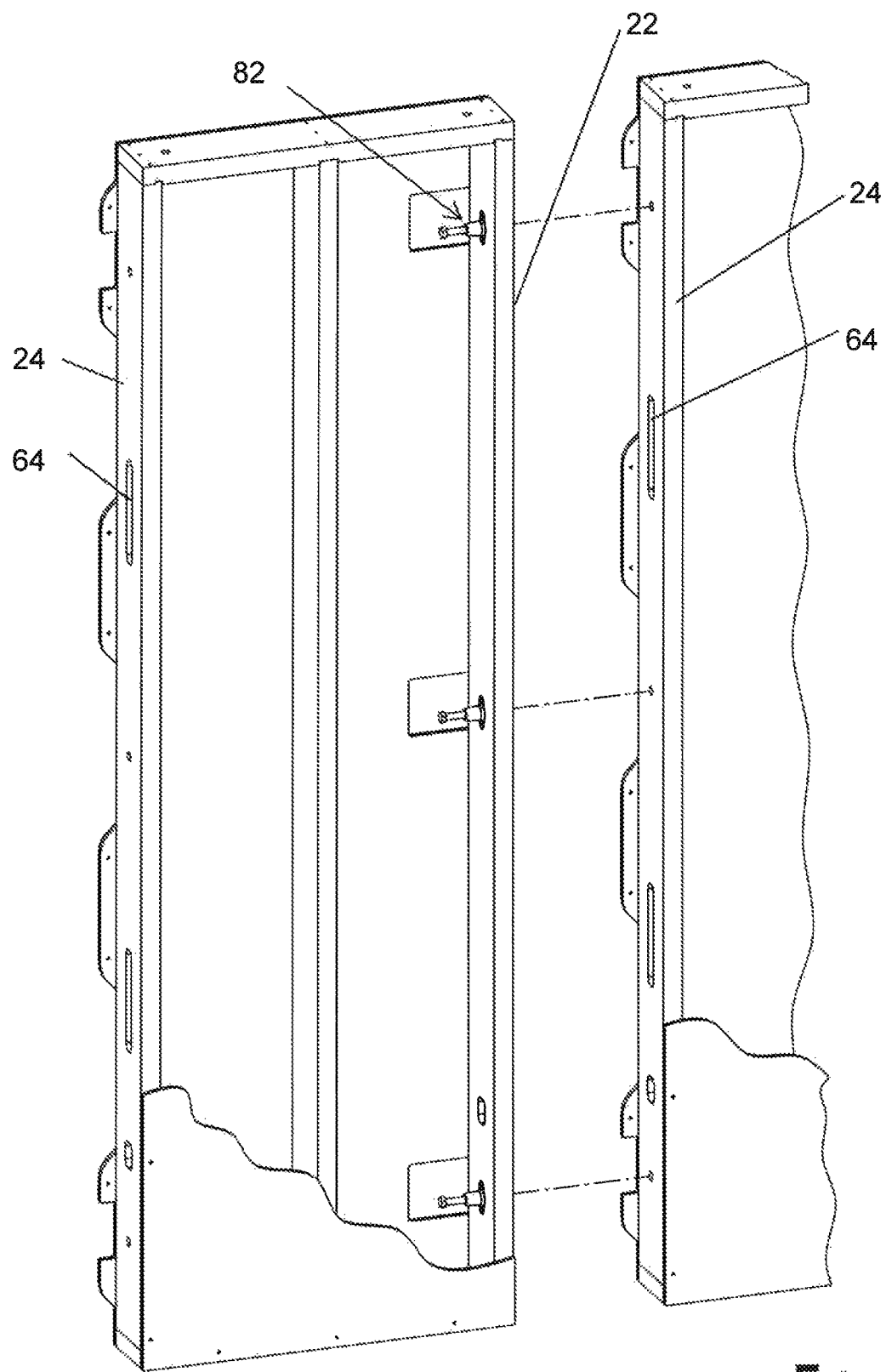
Figure 32:
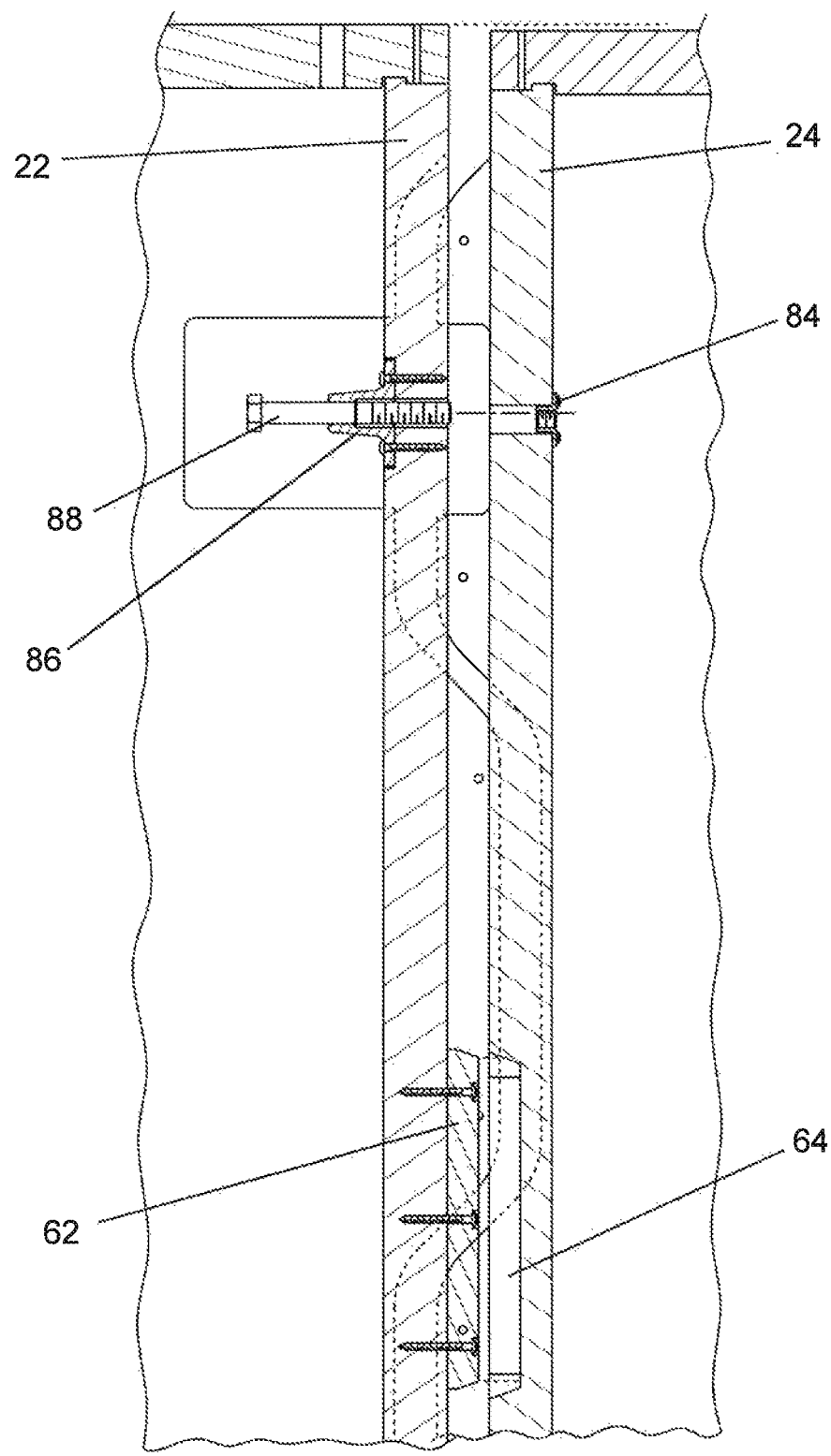

The practice of joining panels using the alternative connector will now be described. FIGS. 26 and 27 depict representative views of panels having the alternative connectors for securing adjoining panels together. As shown in the FIG. 26, a plurality of male connectors, in this instance three male connectors as represented by the three visible bolts 88 protruding from the male end stud 22 of the right panel 10 are shown. The bolts as shown may be provided at locations spaced along the male end stud 22, to be received within corresponding portions of the connectors, as will be described, in the female end stud of the left panel. In combination with the alternative connectors, the panels may utilize one or more location lugs 62, depicted here as a pair of location lugs 62, that can be received within corresponding recesses openings of the female end stud of the left panel 10. FIG. 27 depicts an alternative view of the panels being joined with the alternative connectors, with the skin partially removed for clarity. As depicted in FIG. 27, there are provided three male connector elements 82 along the male end stud 22 of the left panel. The female end stud 24 has three bolt receiving passageways that are to be aligned with the bolts and lead to the female connector elements, as will be discussed. Additionally, the female end stud 24 of the right panel is provided with a pair of recessed openings 64, for receipt of location lugs therein as the panels are approximated. The sequence for joining panels using the location lugs, and alternative connectors are discussed with reference to FIGS. 31-34 below. As described previously, the first panel with the male end stud 22 is generally or nearly aligned vertically and generally or nearly in the same plane with the second panel having the female end stud 24 and shown in FIG. 31. Note that in FIG. 31, the center axis of the bolt 88 is not in precise vertical alignment with the center of the tee-nut 84, as it is biased above the tee-nut 84. The panels 10 are then brought in closer proximity, but not yet adjoining, and as they are approximated together, the waveform complementary edges of the interior and exterior skins 18, 20 of the first and second panels respectively begin to mesh together and provide self-centering to bring the panels into closer alignment, as shown in FIG. 32. If present, location lugs 62 on the male end stud 22 are to be positioned to enter within interior dimensions of the recessed opening 64 on the female end stud 24 as the panels are brought closer together, as shown in FIG. 32. Note that the center of the bolt 88 is closer to being in alignment with the tee-nut, but not precisely aligned. As before, the positioning of the panels relative to each other for approximation can easily be performed by one or two people, where the panel are sized such that they can be moved without lifting or moving equipment. Alternatively, lifting equipment, such as telehandlers, fork lifts, or front end loaders, may be utilized to assist in moving the panels. In practice, the panels may be positioned such that the skins may be partially meshed together, and will tend to stay in place relative to each other, and may self-stand in many cases, allowing the operation of the alternative connector mechanism, as will be described.

Figure 33:
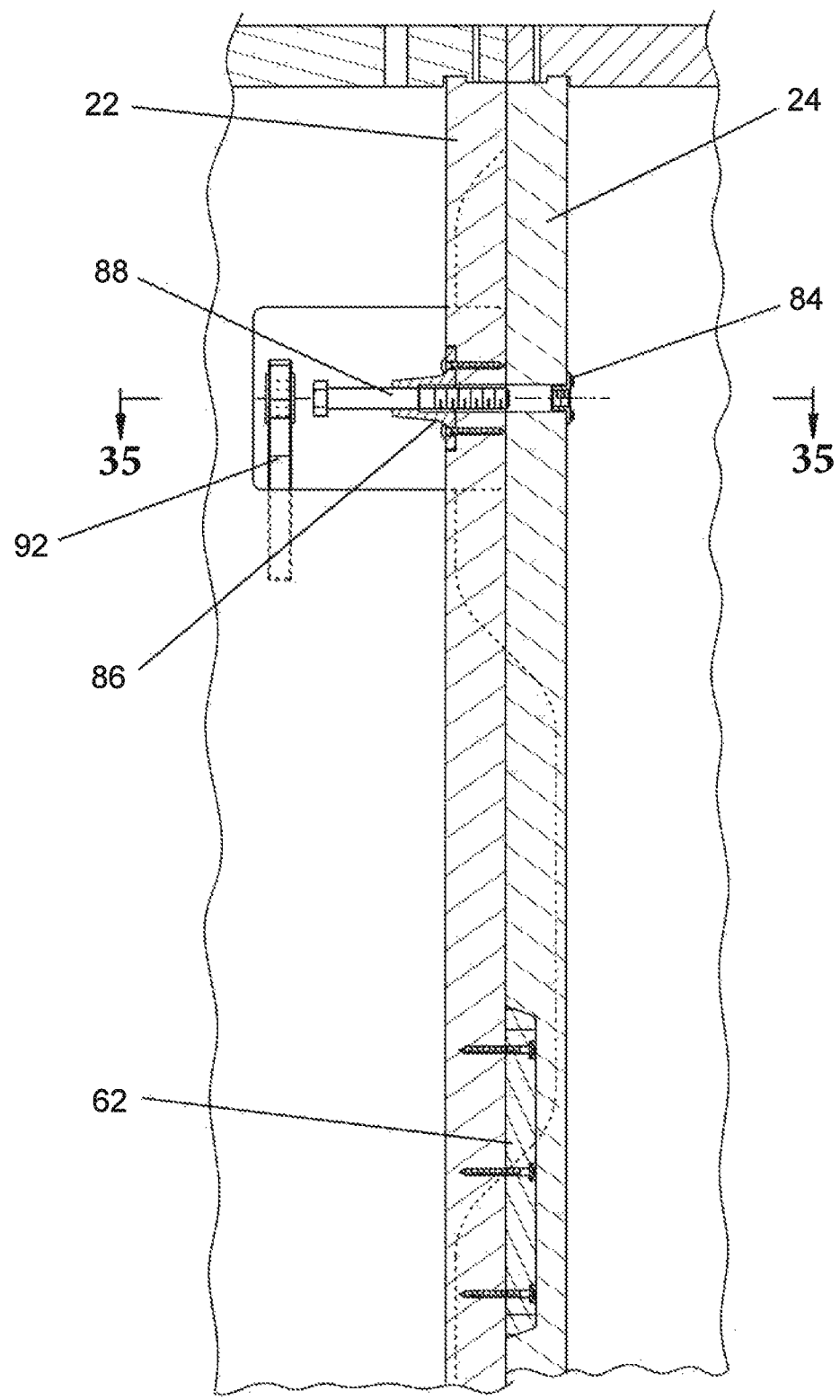
Figure 34:
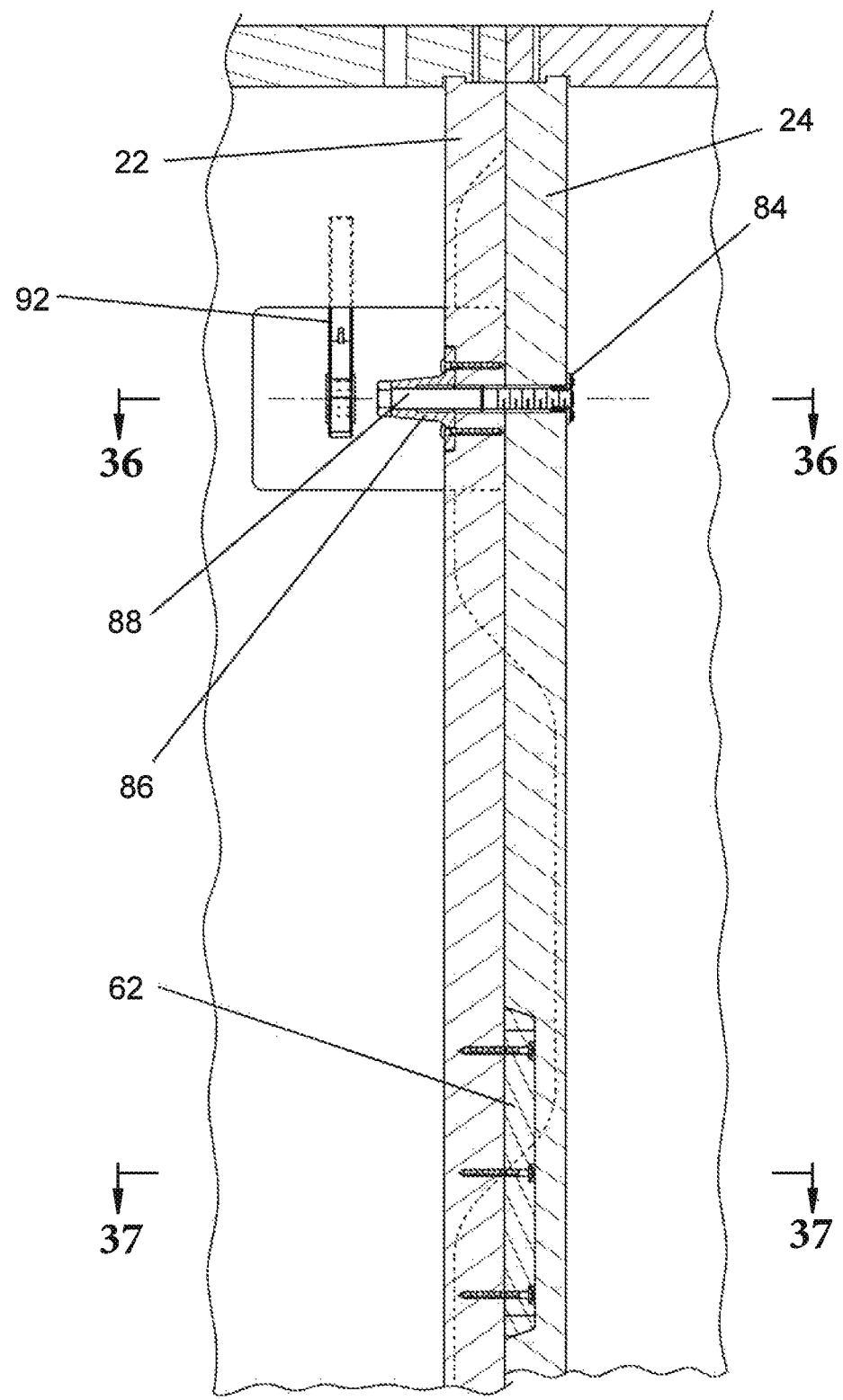

The alternative connector mechanism consists of a male connector 82 on the male end stud of a first panel, and a female connector on the female end stud of the second panel. The male connector 82 may be the captive bolt assembly previously described, having a threaded end of a bolt 88 that is directed towards the female connector in the form of a captive tee-nut 84, as previously described. As the panels to be joined are brought closely in position together, as shown in FIG. 33, the angled surfaces of the complementary skin edges will slide against each other, bringing the panels into closer alignment with each other. Additionally, the location lugs 62, if present, having a tapered sidewall that fits into the tapered recessed opening 64, will be self-centering as they are caused to slide against each other when the panels are brought together, and thus further urge the panels into precise alignment and provide positive registration to ensure accurate positioning relative to each other. As shown in FIG. 33, when the male end stud 22 and female end stud 24 of the two panels are touching, or in close proximity, the center line of the bolt 88 is aligned with the tee-nut 84, or very nearly so, such that the bolt 88 can be advanced into the tee-nut, as follows. The bolt 88 may be rotated by placing wrench 92, or other suitable tool over the head of the bolt 88. As shown, an access opening may be provided in the skin to allow access to the bolt 88 with the wrench 92. The bolt is urged or slid towards the tee-nut and is rotated to cause the opposing threads of the bolt and tee-nut to engage. Continued rotation will cause the bolt to be tightened further into the tee-nut, until the head of the bolt 88 encounters the flange 86. Continued rotation to tighten the bolt 88 will then draw the male end stud 22 and female end stud 24 tightly together, with additional positional registration as the wave form edges are fully engaged or meshed together, and/or the location lug(s) 62 are caused to advance fully into the recessed opening 64. With the end studs tightly compressed against each other by the connector mechanisms, the panels are securely joined, as shown in FIG. 34, and the wrench 92 may be removed from the bolt 88. The access opening may optionally be sealed, with a replaceable panel, or sealed with a tape layer that can prevent moisture, and wind penetration through the panel, and provide draft proof wall panels.

In an embodiment, the male and female portions of the connector mechanism may each be provided within a mortise in the respective end studs that are to be approximated together, and may optionally be inset from the outside end dimension of the end stud it is housed within. In order to distribute loads over portion of the end stud, the connector mechanism components may be provided with a flanged end that rests against the end stud. For example, where the connector is as shown in FIG. 9, as the cam 40 is rotated to urge the adjoining panels together, the material of the adjacent male and female end studs 22, 24 can be compressed together, and due to being slightly inset within the studs, the housings for each of the male and female connector mechanism components will not run into each other, as were the housings to encounter each other they would prevent the compressing of the end studs together. The amount that each of the male and female portions of the connector mechanism are to be inset from the outside dimension of the respective end stud varies with the compressibility of the end stud material. For example, where the end studs are a less compressible material, such as metal, or hardwood lumber, the inset may only be approximately $1/32"$ for each of the housings, and where the end studs are a softer or more compressible material, such as softwood, or laminated strand board, the inset may be $1/8"$. The depth of the inset for each of the connector mechanism housings may thus be less than or equal to $1/2"$, less than or equal to $3/4"$, less than or equal to $1/8"$, less than or equal to $1/16"$, less than or equal to $1/32"$. Alternatively, where no compression of the end studs is required, the connector mechanism housings may optionally be located with their ends flush with the outside dimension of the end stud. The connection mechanism components may be inserted into a mortise created within the end stud, as depicted in FIG. 11, and in greater detail in FIG. 5. To accommodate varying or imprecise lumber dimensions, as noted above, a mortise may optionally be created in the inside surface of the end stud that can accommodate the flange end of the connector mechanism, in order to ensure accuracy in depth placement within the end stud. In this manner, as the end studs are urged together by the connector mechanism, the possible compression of the end stud material is accounted for, and can provide for better fit together of the panels.

With the two modular panels 10 having been drawn and locked together with the one or more connector mechanisms at each panel juncture, the additional fasteners, such as nails or screws may be applied in those areas where a protruding portion of the skin of each panel extends over the end stud of the adjoining panel, in order to further secure panels together, as depicted in FIG. 8. These additional fasteners are to be applied only after the panels are engaged tightly, such as when each of the connector mechanisms are tightened, as if the additional fasteners are deployed prior to that, the screws would prevent further movement of the panels relative to each other. Optionally, a barrier layer may be applied over the adjoining panel edges, such as by applying a vapor barrier tape over the length of the joined edge, to provide resistance to moisture penetration, and prevent drafts through panel joint.

Should disassembly of the panels be desired, such as may be necessary when the shelter is no longer needed, or is to be moved, the fasteners that connect the skin of a first panel to the end stud of a second panel may be removed, and the key 44 inserted to loosen the connector mechanism, thereby allowing the panels 10 to move relative to each other and allow disassembly of the vertical wall 9.

In an embodiment, the vertical wall 9 may provide one or more openings 42 within some or all of the vertical studs 16, as depicted in FIGS. 11 and 14, in order to allow utilities or other lines, such as water, gas (e.g., natural gas and liquid or low pressure propane), electric, data, or heating and air conditioning lines, as non-limiting examples, to be run through the panels. Preferably, each of the openings 42 in the plurality of studs 16 would be at a consistent height, for ease in running the utility lines. It is further contemplated that a first set of lines may be run through one set of openings at one height, and another set of utility lines may be run through another set of openings at a different height. Alternatively, multiple utilities maybe run through the same set of openings in the vertical studs.

In an exemplary embodiment, it is contemplated alternative junctures of adjoining panels may be completed with one or more adapter modules, each having a plurality of edges configured to join to panels in a manner similar to the joining of panels already described. Depicted in FIGS. 19-24 are adapter modules 55 for joining panels together in an "X" shape, a "T" shape, and an "L" shape. These embodiments of adapter modules may feature two or more ends that may be either a male or female end, to receive the complementary panel, as discussed previously.

With reference specifically to FIGS. 23 and 24, there are depicted an adapter module 55 having a cross shape when viewed from a vertical perspective. The adapter module of FIGS. 23 and 24 are thus provided to join up to four panels in a four-way connection, with 90 degree corners between each of the panels created by the adapter module configuration. Each of the ends of the cross-shaped adapter module may be one of either a male or female end, as needed to accommodate an adjoining panel, in the manner discussed previously. As can be seen in the exemplary embodiment of FIG. 23, at least two of the ends are male. As can be seen in the exemplary embodiment of FIG. 24, at least two of the ends are female. It is contemplated that the adapter may provide for all of the ends being of the same connection type, either male or female; alternatively, the adapter may provide ends that are a mix of male and female ends, either two of each, or three of one type and one of the other. Each of the ends of the adapter module may provided with one or more connector mechanisms, and employed in the same fashion as discussed with reference to FIGS. 4-10.

Figures 21, 22:
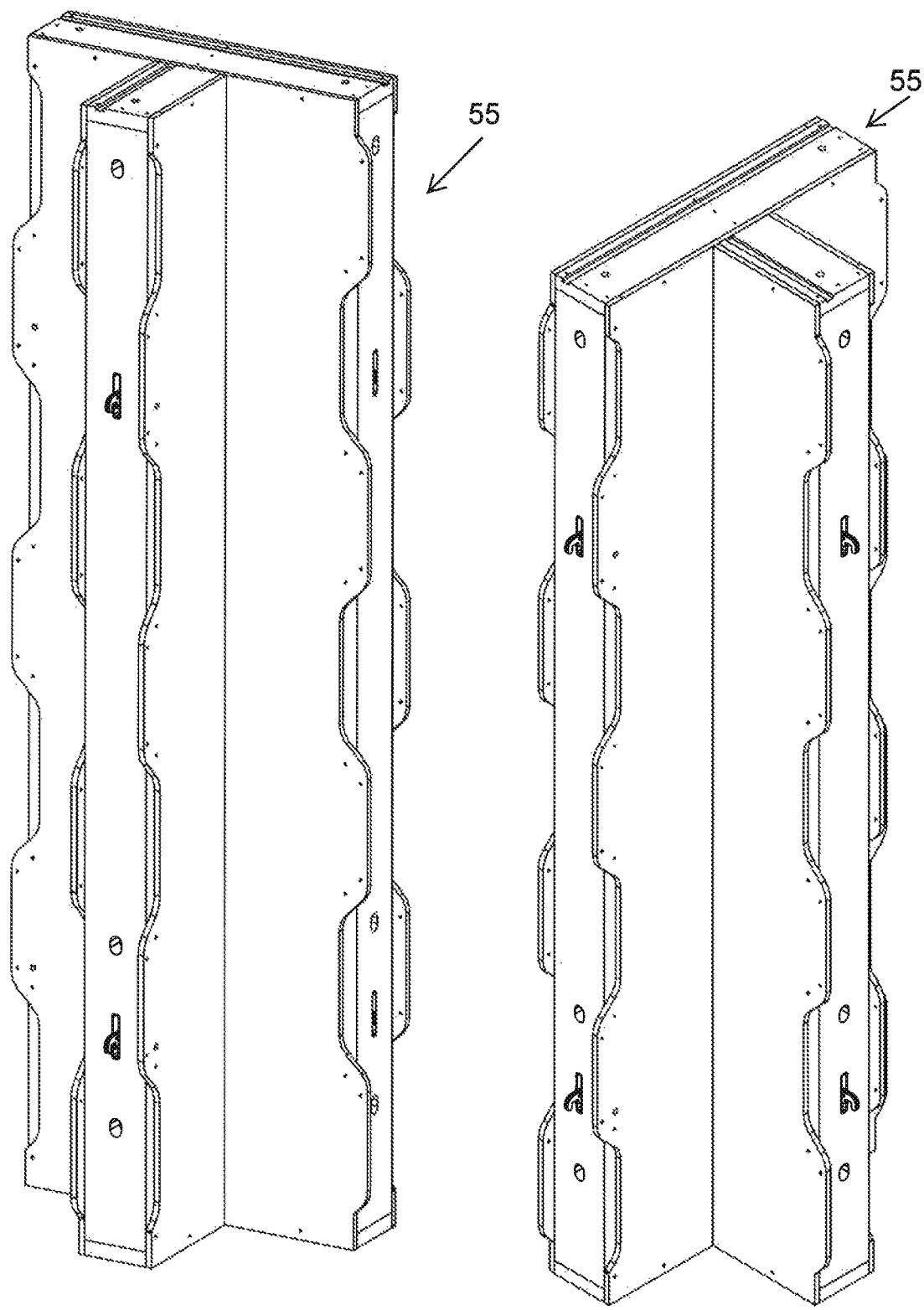
FIGS. 21 and 22 depict perspective views of an exemplary embodiment of a connector module embodiment configured to join modular panels in an "T" shape.

With reference specifically to FIGS. 21 and 22, there are depicted an adapter module 55 having a "T" shape when viewed from a vertical perspective. The adapter module of FIGS. 21 and 22 are thus provided to join up to three panels in a three-way connection. As depicted, the panels may be joined at either a 90 degree angle or may alternatively be part of a straight connection between aligned panels in a plane, optionally having a third panel extending in a plane perpendicular to the plane of the aligned panels. Each of the ends of the "T" shaped adapter module may be one of either a male or female end, as needed to accommodate an adjoining panel, in the manner discussed previously. It is contemplated that the adapter may provide for all of the ends being of the same connection type, either male or female; alternatively, the adapter may provide ends that are a mix of male and female ends, either two of a first type, and one of the second type. Each of the ends of the adapter module may be provided with one or more connector mechanisms and employed as has been discussed.

With reference specifically to FIGS. 17 and 18, there are depicted adapter modules 55 having an "L" shape when viewed from a vertical perspective. The adapter module of FIGS. 17 and 18 are thus provided to join two panels in a corner configuration. As depicted, the panels may be joined at a 90-degree angle. Each of the ends of the "L" shaped adapter module may be one of either a male or female end, as needed to accommodate an adjoining panel, in the manner discussed previously. It is contemplated that the adapter may provide for both of the ends being of the same connection type, either male or female; alternatively, the adapter may provide ends that are a mix of male and female ends having one of a first type, and one of the second type. Each of the ends of the adapter module may be provided with one or more connector mechanisms and employed as has been discussed. As can be seen with reference to FIG. 19, it is optionally contemplated that a third panel end may join at the corner end of one of the legs of the "L" shaped adapter, for example, as shown, there is provided a pair of female connector mechanisms, capable of receiving an adjoining panel having male end connectors. As depicted, the optional waveform registration is provided for each of the connections at the ends of the "L" shaped connector, and no wave form registration is provided at the connection in the middle of the L. It is recognized that one of the skins of the L-shaped adapter module may provide for waveform registration to accept the connection in the middle of the L-shaped adapter.

For any of the adapter modules described herein, it is contemplated that alteration of the adapter modules into different angular formations may be possible to create intersecting panels at other angles, and need not be limited exclusively to right angles connections, as will be understood by those skilled in the art; though right angles would be the most common format in creating modular structures.

Figure 15:
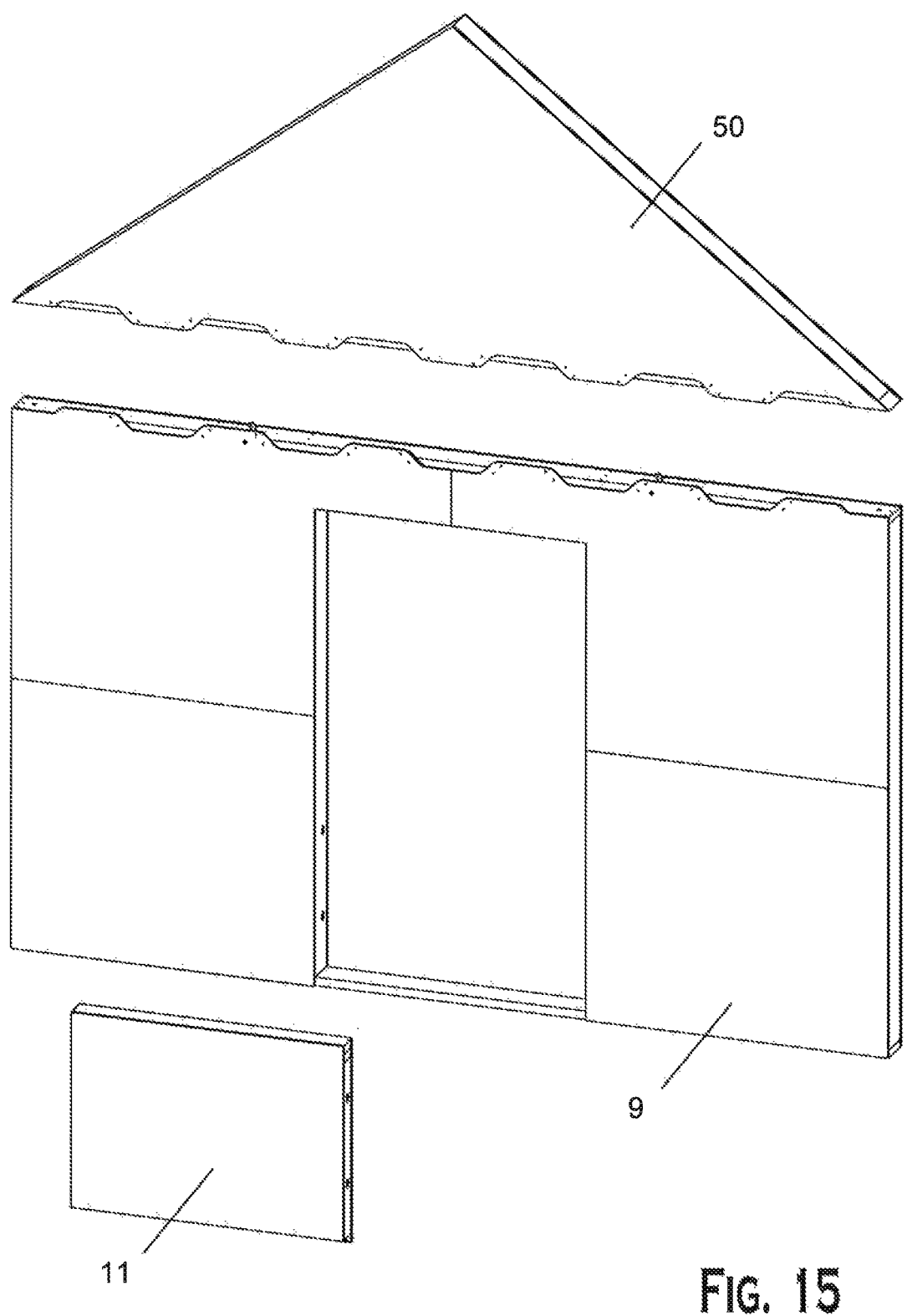
FIG. 15 is a partially exploded perspective side view of components of an alternative exemplary embodiment of the modular panel, having a window opening in the panel, an insert panel, and a modular gable component configured to be secured to the modular panel.
Figure 16:
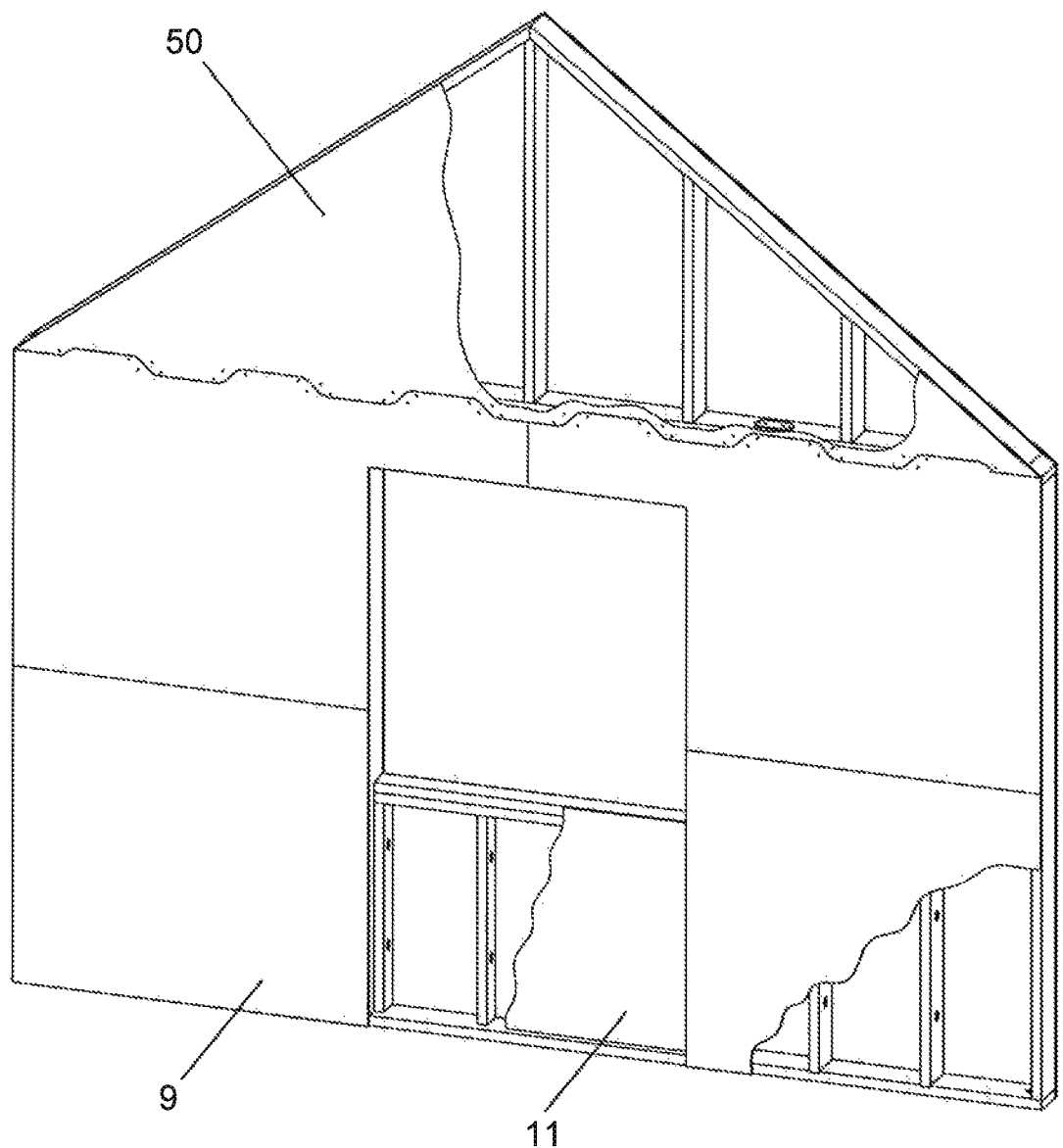
FIG. 16 is a perspective, partial cut-away view of components of an alternative exemplary embodiment of the modular panel, having a window opening in the panel, an insert panel, and a modular gable component configured to be secured to the modular panel.

The connection of adjoining panels with waveform edges, as has been discussed above, may also allow for panels arranged vertically relative to each other to be joined, as can be seen with reference now to FIGS. 15 and 16. For example, as depicted in FIG. 15, there is provided a pair of modular panels having complementary wave form edges, namely, the modular panel for use as a vertical wall 9 with a waveform edge along the topmost edge of the panel, such as along the top plate edge, and also a modular panel in the form of a gable 50 panel, with the complementary waveform edge along the bottom edge of the gable. As has been described previously, one or more connector mechanism may be employed to facilitate the joining of the modular panels, and as shown, a pair of male connectors are visible on the wall panel 9. Though not visible, there would be a pair of corresponding female connectors on the gable panel to secure the connection. In this manner, panels may be connected vertically, creating a vertical planar surface comprising two or more panels. It is recognized that any one or more of the edges surrounding the panel may feature the waveform edge for one, or both of the skins on the major surfaces of the panel. It is contemplated that any variety, shape, or usage of connecting panels may be provided, and configured to be connected through the use of one or more connector mechanisms, as has been discussed.

It is contemplated that the components and aspects of the disclosure may be incorporated into various forms, such as providing adjoining panels of a structure that form any one or more of a floor, wall, ceiling, or roof of a structure. It is recognized that a panel may have the waveform edge on any of the sides of the modular panels, such that the panels may be connected horizontally or vertically in a planar surface. Additionally, it is contemplated that incorporation of the adapter modules described in FIGS. 19-24 maybe employed in connecting modular panels to build a structure having more complex shapes, such as may be possible by providing a vertical surface comprised of multiple modular panels joined as discussed herein, and having one or more adapter modules along a top edge of the vertical surface, such that another planar surface forming a ceiling may be secured to the adapter module in an orientation that is perpendicular to the vertical surface. Optionally, another layer of modular panels may be connected in a vertical orientation to the connector module, thereby extending the vertical surface further above the adapter module. Using the combination of modular panels, and adapter modules, complex shapes and structures may be created.

With reference to FIG. 16, there is also provided within the wall panel 9, a window opening. Immediately below the window opening there may be a panel insert 11 that may be secured within an opening in the wall panel 9, leaving the window opening clear above the inserted panel. The panel insert 11, as shown, need not have the aforementioned wave form registration on the sides, rather it features edges that allow the panel insert 11 to be placed into the opening, and may optionally be secured on opposing sides of the panel insert 11 to the vertical boundaries of the opening by one or more of latches, nails, screws, or other suitable fasteners known to those skilled in the art. The opening in the wall panel 9, may initially be doorway sized (as depicted in FIG. 15), such that insertion of the panel insert 11 into the wall panel 9, as depicted, converts the doorway sized opening to a window sized opening, by filling in a portion of the opening with the inserted panel. The panel insert 11 may optionally feature the same openings 42 for passage of utility lines therethrough, as discussed previously. The panel insert 11 may be put in place within the wall 9 at any desired point, including as non-limiting examples, any of: during construction of the panel; prior to arriving at the assembly site; during the assembly of the shelter on site. Furthermore, the panel insert 11 may be removable, to allow on-site customization of the shelter, such as by converting from presenting a window opening in the panel to providing a doorway opening, which may then optionally receive a hinged door (not depicted) therein, as would be understood by one of skill in the art.

The foregoing illustrates some of the possibilities for practicing the invention. Many other embodiments are possible within the scope and spirit of the invention. The disclosed invention utilizes the above identified components, as a system, in order to more efficiently construct a modular construction system. Therefore, more or less of the aforementioned components can be used to conform to that particular purpose. It is, therefore intended that the foregoing description be regarded as illustrative rather than limiting, and that the scope of the invention is given by the appended claims together with their full range of equivalents.

What is claimed is:

1. A modular panel, comprising:
    a sill plate, a top plate, a plurality of vertical studs extending between top plate and the sill plate, and at least one skin on a major face of the modular panel presenting at least a first edge corresponding to the thickness of the skin and having a length, the at least a first edge having a waveform profile over less than the length, for connecting to an adjacent modular panel; and
    at least one of the vertical studs being an end stud and having at least one connector element configured to be secured to a complementing connector element of an adjacent second modular panel.

2. The modular panel of claim 1, wherein the at least a first edge of the skin provides protruding portions and recessed portions.

3. The modular panel of claim 2, wherein said waveform is selected from the group consisting of trapezoidal, sinusoidal, square, rectangular, triangular, and sawtooth, and combinations thereof.

4. The modular panel of claim 3, wherein said first edge is configured to engage a complementary second edge of the adjacent second panel.

5. The modular panel of claim 1, wherein said at least one connector element is a captive bolt assembly, and the complementing connector element is a tee-nut.

6. The modular panel of claim 5, wherein the captive bolt assembly has a flange and a bolt having a head and a body with at least a portion of the body being threaded to rotatably engage with the tee-nut.

7. The modular panel of claim 4, wherein the first edge further comprises at least one location lug.

8. The modular panel of claim 7, wherein the second edge further comprises at least one recessed opening to receive the location lug therein.

9. The modular panel of claim 1, wherein said at least one connector element is part of a blind panel connector.

10. The modular panel of claim 9, wherein said at least one connector element is one of a hook element or a pin element.

11. The modular panel of claim 1, wherein said waveform profile of the at least a first edge has a midline that aligns with the outside dimension of the end stud.

12. The modular panel of claim 1, wherein the modular panel and the adjacent second modular panel are connected to form a vertical wall.

13. The modular panel of claim 12, wherein the vertical wall is part of a modular shelter.

14. The modular panel of claim 1, wherein the modular panel has at least one opening.

15. The modular panel of claim 4, further comprising at least a second edge of the modular panel on an opposite side of the skin from the first edge of the modular panel, the second edge of the modular panel presenting a waveform profile that is complementary to the waveform profile of the first edge of the modular panel.

16. The modular panel of claim 15, wherein the modular panel has a first vertical stud and a second vertical stud, the first vertical stud being a male end stud, the second vertical stud being a female end stud.

17. The modular panel of claim 16, wherein the male end stud has the connector element that is one of a protruding blind connector and a captive bolt assembly.

18. The modular panel of claim 16, wherein the female end stud has the complementing connector element that is one of a receiving blind connector and a tee-nut.

19. The modular panel of claim 16, wherein the waveform of the second edge of the modular panel has a second midline that aligns with an outside dimension of the second end stud.

20. A modular panel system comprising at least a first modular panel and a second modular panel, each of the first modular panel and the second modular panel comprising a sill plate, a top plate, a plurality of studs extending between top plate and the sill plate, and having at least one skin on a major face of each of the first modular panel and the second modular panel,
   the first modular panel having a first edge corresponding to the thickness of the skin and having a length having a first waveform profile over less than the entire length, and at least one of the vertical studs of the first modular panel being a first end stud and having at least one first connector element;
   the second modular panel having a second edge of the skin having a second waveform profile that is complementary to the first waveform profile of the first modular panel, and at least one of the vertical studs of the second modular panel being a second end stud and having at least one second connector element that is complementary to the first connector element;
   wherein the first and second end studs may be connected together so as to join the first and second modular panels together.

21. The modular panel system of claim 20, further comprising at least one adapter module having at least a first and second edge of the adapter module, each of the first and second edge of the adapter module configured to conform to an edge of the first modular panel or the second modular panel.

22. The modular panel system of claim 21, wherein the adapter module comprises a shape selected from the group consisting of cross-shaped, T-shaped or L-shaped.

23. The modular panel system of claim 20, wherein the at least one first connector element is selected from a male blind panel connector, and a captive bolt assembly, and the at least one second connector element is selected from a female blind panel connector, and a tee-nut.

* * * * *